(12) United States Patent
Tsang et al.

(10) Patent No.: US 11,880,377 B1
(45) Date of Patent: Jan. 23, 2024

(54) SYSTEMS AND METHODS FOR ENTITY RESOLUTION

(71) Applicant: Experian Information Solutions, Inc., Costa Mesa, CA (US)

(72) Inventors: Alan Tsang, San Diego, CA (US); Zehua Guo, San Diego, CA (US); Derek John Toub, San Diego, CA (US); Mustafa Yakub Adib, San Diego, CA (US); Yue Yu, San Diego, CA (US); Shervin Sharifi, San Diego, CA (US); Christer Dichiara, Carlsbad, CA (US); Hua Li, San Diego, CA (US); Wis Kojohnjaratkul, San Diego, CA (US); Stuart Anthony Mathews, Tustin, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 112 days.

(21) Appl. No.: 17/703,909

(22) Filed: Mar. 24, 2022

Related U.S. Application Data

(60) Provisional application No. 63/166,841, filed on Mar. 26, 2021.

(51) Int. Cl.
*G06F 7/00* (2006.01)
*G06F 16/2458* (2019.01)

(52) U.S. Cl.
CPC .............................. *G06F 16/2468* (2019.01)

(58) Field of Classification Search
CPC .... G06F 16/245; G06F 16/288; G06F 16/285; G06F 16/9535; G06F 16/27;
(Continued)

(56) References Cited

U.S. PATENT DOCUMENTS 4,163,290 A 7/1979 Sutherlin et al.
4,827,508 A 5/1989 Shear
(Continued)

FOREIGN PATENT DOCUMENTS

AU 2004220812 9/2004
AU 2010200017 1/2010
(Continued)

OTHER PUBLICATIONS

U.S. Appl. No. 12/705,489, filed Feb. 12, 2010, Bargoli et al.
(Continued)

*Primary Examiner* — Mohammad A Sana
(74) *Attorney, Agent, or Firm* — Knobbe, Martens, Olson & Bear, LLP

(57) ABSTRACT

Systems and methods are described for identifying a target entity that a user intends to refer to based on input that may include only a partial name of the entity. A system may receive a user's entity search query, which may include a partial entity name, then may determine initial candidate matching entities and associated name match scores for each of the initial candidate matching entities relative to the input string, such as using string matching or fuzzy matching techniques. The system may apply a probability match model to generate an overall match score for individual ones of the initial candidate matching entities, then may generate a response to the entity search query that includes information regarding one or more of the initial candidate matching entities with an overall match score exceeding a threshold.

19 Claims, 14 Drawing Sheets

(58) Field of Classification Search
CPC .............. G06F 16/248; G06F 16/337; G06F 16/24573; G06F 16/9014; G06F 16/2468; G06F 16/90344; G06F 16/2365; G06F 16/258; G06F 9/54; G06Q 40/03
See application file for complete search history.

(56) References Cited

U.S. PATENT DOCUMENTS

| | | |
|---|---|---|
| 4,868,570 A | 9/1989 | Davis |
| 4,935,870 A | 6/1990 | Burk, Jr. et al. |
| 4,989,141 A | 1/1991 | Lyons et al. |
| 5,216,612 A | 6/1993 | Cornett et al. |
| 5,247,575 A | 9/1993 | Sprague et al. |
| 5,274,547 A | 12/1993 | Zoffel et al. |
| 5,325,509 A | 6/1994 | Lautzenheiser |
| 5,341,429 A | 8/1994 | Stringer et al. |
| 5,528,701 A | 6/1996 | Aref |
| 5,555,409 A | 9/1996 | Leenstra, Sr. et al. |
| 5,590,038 A | 12/1996 | Pitroda |
| 5,621,201 A | 4/1997 | Langhans et al. |
| 5,629,982 A | 5/1997 | Micali |
| 5,630,070 A | 5/1997 | Dietrich et al. |
| 5,640,551 A | 6/1997 | Chu et al. |
| 5,640,577 A | 6/1997 | Scharmer |
| 5,655,129 A | 8/1997 | Ito |
| 5,659,731 A | 8/1997 | Gustafson |
| 5,666,528 A | 9/1997 | Thai |
| 5,692,107 A | 11/1997 | Simoudis et al. |
| 5,737,732 A | 4/1998 | Gibson et al. |
| 5,739,512 A | 4/1998 | Tognazzini |
| 5,748,098 A | 5/1998 | Grace |
| 5,754,632 A | 5/1998 | Smith |
| 5,754,939 A | 5/1998 | Herz et al. |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,822,750 A | 10/1998 | Jou et al. |
| 5,822,751 A | 10/1998 | Gray et al. |
| 5,825,884 A | 10/1998 | Zdepski et al. |
| 5,828,837 A | 10/1998 | Eikland |
| 5,832,068 A | 11/1998 | Smith |
| 5,835,915 A | 11/1998 | Carr et al. |
| 5,842,185 A | 11/1998 | Chancey et al. |
| 5,844,218 A | 12/1998 | Kawan et al. |
| 5,881,131 A | 3/1999 | Farris et al. |
| 5,893,090 A | 4/1999 | Friedman et al. |
| 5,905,985 A | 5/1999 | Malloy et al. |
| 5,956,693 A | 9/1999 | Geerlings |
| 5,961,593 A | 10/1999 | Gabber et al. |
| 5,963,932 A | 10/1999 | Jakobsson et al. |
| 5,966,695 A | 10/1999 | Melchione et al. |
| 6,014,688 A | 1/2000 | Venkatraman et al. |
| 6,026,381 A | 2/2000 | Barton, III et al. |
| 6,038,551 A | 3/2000 | Barlow et al. |
| 6,070,147 A | 5/2000 | Harms et al. |
| 6,073,106 A | 6/2000 | Rozen et al. |
| 6,073,140 A | 6/2000 | Morgan et al. |
| 6,085,242 A | 7/2000 | Chandra |
| 6,119,103 A | 9/2000 | Basch et al. |
| 6,121,901 A | 9/2000 | Welch et al. |
| 6,128,602 A | 10/2000 | Northington et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,707 A | 12/2000 | Baulier et al. |
| 6,157,927 A | 12/2000 | Schaefer et al. |
| 6,161,139 A | 12/2000 | Win et al. |
| 6,173,284 B1 | 1/2001 | Brown |
| 6,178,442 B1 | 1/2001 | Yamazaki |
| 6,199,077 B1 | 3/2001 | Inala et al. |
| 6,202,053 B1 | 3/2001 | Christiansen et al. |
| 6,223,171 B1 | 4/2001 | Chaudhuri et al. |
| 6,233,588 B1 | 5/2001 | Marchoili et al. |
| 6,253,202 B1 | 6/2001 | Gilmour |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,275,824 B1 | 8/2001 | O'Flaherty et al. |
| 6,304,869 B1 | 10/2001 | Moore et al. |
| 6,311,169 B2 | 10/2001 | Duhon |
| 6,317,783 B1 | 11/2001 | Freishtat et al. |
| 6,339,769 B1 | 1/2002 | Cochrane et al. |
| 6,366,903 B1 | 4/2002 | Agrawal et al. |
| 6,397,197 B1 | 5/2002 | Gindlesperger |
| 6,405,173 B1 | 6/2002 | Honarvar |
| 6,405,245 B1 | 6/2002 | Burson et al. |
| 6,446,200 B1 | 9/2002 | Ball et al. |
| 6,448,980 B1 | 9/2002 | Kumar et al. |
| 6,453,353 B1 | 9/2002 | Win et al. |
| 6,457,012 B1 | 9/2002 | Jatkowski |
| 6,463,533 B1 | 10/2002 | Calamera et al. |
| 6,477,565 B1 | 11/2002 | Daswani et al. |
| 6,496,819 B1 | 12/2002 | Bello et al. |
| 6,496,931 B1 | 12/2002 | Rajchel et al. |
| 6,505,168 B1 | 1/2003 | Rothman et al. |
| 6,517,587 B2 | 2/2003 | Satyavolu et al. |
| 6,523,021 B1 | 2/2003 | Monberg et al. |
| 6,523,022 B1 | 2/2003 | Hobbs |
| 6,523,041 B1 | 2/2003 | Morgan et al. |
| 6,543,683 B2 | 4/2003 | Hoffman |
| 6,564,210 B1 | 5/2003 | Korda et al. |
| 6,567,850 B1 | 5/2003 | Freishtat et al. |
| 6,574,623 B1 | 6/2003 | Laung et al. |
| 6,574,736 B1 | 6/2003 | Andrews |
| 6,581,059 B1 | 6/2003 | Barrett et al. |
| 6,601,173 B1 | 7/2003 | Mohler |
| 6,601,234 B1 | 7/2003 | Bowman-Amuah |
| 6,618,727 B1 | 9/2003 | Wheeler et al. |
| 6,633,910 B1 | 10/2003 | Rajan et al. |
| 6,647,383 B1 | 11/2003 | August et al. |
| 6,651,220 B1 | 11/2003 | Penteroudakis et al. |
| 6,658,393 B1 | 12/2003 | Basch et al. |
| 6,665,677 B1 | 12/2003 | Wotring et al. |
| 6,691,136 B2 | 2/2004 | Lee et al. |
| 6,708,166 B1 | 3/2004 | Dysart et al. |
| 6,714,944 B1 | 3/2004 | Shapiro et al. |
| 6,725,381 B1 | 4/2004 | Smith et al. |
| 6,725,425 B1 | 4/2004 | Rajan et al. |
| 6,738,748 B2 | 5/2004 | Wetzer |
| 6,738,759 B1 | 5/2004 | Wheeler et al. |
| 6,742,001 B2 | 5/2004 | Ripley |
| 6,748,426 B1 | 6/2004 | Shaffer et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,802,042 B2 | 10/2004 | Rangan et al. |
| 6,804,346 B1 | 10/2004 | Mewhinney |
| 6,804,701 B2 | 10/2004 | Muret et al. |
| 6,816,871 B2 | 11/2004 | Lee |
| 6,839,714 B2 | 1/2005 | Wheeler et al. |
| 6,842,782 B1 | 1/2005 | Malik et al. |
| 6,845,448 B1 | 1/2005 | Chaganti et al. |
| 6,850,895 B2 | 2/2005 | Brodersen et al. |
| 6,853,997 B2 | 2/2005 | Wotring et al. |
| 6,865,680 B1 | 3/2005 | Wu et al. |
| 6,871,220 B1 | 3/2005 | Rajan et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,947,984 B2 | 9/2005 | Schweitzer et al. |
| 6,947,989 B2 | 9/2005 | Gullotta et al. |
| 6,950,858 B2 | 9/2005 | Ogami |
| 6,954,757 B2 | 10/2005 | Zargham et al. |
| 6,976,056 B1 | 12/2005 | Kumar |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,985,898 B1 | 1/2006 | Ripley et al. |
| 6,999,941 B1 | 2/2006 | Agarwal |

(56) References Cited

U.S. PATENT DOCUMENTS

| | | |
|---|---|---|
| 7,003,504 B1 | 2/2006 | Angus et al. |
| 7,013,310 B2 | 3/2006 | Messing et al. |
| 7,016,907 B2 | 3/2006 | Boreham et al. |
| 7,028,001 B1 | 4/2006 | Muthuswamy et al. |
| 7,028,052 B2 | 4/2006 | Chapman et al. |
| 7,035,855 B1 | 4/2006 | Kilger et al. |
| 7,039,176 B2 | 5/2006 | Borodow et al. |
| 7,039,656 B1 | 5/2006 | Tsai et al. |
| 7,043,476 B2 | 5/2006 | Robson |
| 7,047,251 B2 | 5/2006 | Reed et al. |
| 7,050,982 B2 | 5/2006 | Sheinson et al. |
| 7,050,989 B1 | 5/2006 | Hurt et al. |
| 7,062,475 B1 | 6/2006 | Szabo et al. |
| 7,069,240 B2 | 6/2006 | Spero et al. |
| 7,075,894 B2 | 7/2006 | Hein et al. |
| 7,076,475 B2 | 7/2006 | Honarvar et al. |
| 7,082,435 B1 | 7/2006 | Guzman et al. |
| 7,085,997 B1 | 8/2006 | Wu et al. |
| 7,092,898 B1 | 8/2006 | Mattick et al. |
| 7,117,172 B1 | 10/2006 | Black |
| 7,124,144 B2 | 10/2006 | Christianson et al. |
| 7,133,935 B2 | 11/2006 | Hedy |
| 7,155,739 B2 | 12/2006 | Bari et al. |
| 7,167,907 B2 | 1/2007 | Shaffer et al. |
| 7,178,096 B2 | 2/2007 | Rangan et al. |
| 7,184,974 B2 | 2/2007 | Shishido |
| 7,185,016 B1 | 2/2007 | Rasmussen |
| 7,188,107 B2 | 3/2007 | Moon et al. |
| 7,188,252 B1 | 3/2007 | Dunn |
| 7,200,602 B2 | 4/2007 | Jonas |
| 7,219,107 B2 | 5/2007 | Beringer |
| 7,221,377 B1 | 5/2007 | Okita et al. |
| 7,222,369 B2 | 5/2007 | Vering et al. |
| 7,234,160 B2 | 6/2007 | Vogel et al. |
| 7,240,059 B2 | 7/2007 | Bayliss et al. |
| 7,243,369 B2 | 7/2007 | Bhat et al. |
| 7,246,067 B2 | 7/2007 | Austin et al. |
| 7,249,048 B1 | 7/2007 | O'Flaherty |
| 7,249,072 B1 | 7/2007 | Nearhood et al. |
| 7,263,548 B2 | 8/2007 | Daswani et al. |
| 7,272,591 B1 | 9/2007 | Ghazal et al. |
| 7,277,900 B1 | 10/2007 | Ganesh et al. |
| 7,283,998 B2 | 10/2007 | Moon et al. |
| 7,315,837 B2 | 1/2008 | Sloan et al. |
| 7,328,233 B2 | 2/2008 | Salim et al. |
| 7,340,679 B2 | 3/2008 | Botscheck et al. |
| 7,346,703 B2 | 3/2008 | Cope |
| 7,366,694 B2 | 4/2008 | Lazerson |
| 7,367,011 B2 | 4/2008 | Ramsey et al. |
| 7,370,044 B2 | 5/2008 | Mulhern et al. |
| 7,373,335 B2 | 5/2008 | Cleghorn et al. |
| 7,376,603 B1 | 5/2008 | Mayr et al. |
| 7,379,880 B1 | 5/2008 | Pathria et al. |
| 7,383,215 B1 | 6/2008 | Navarro et al. |
| 7,383,988 B2 | 6/2008 | Slonecker, Jr. |
| 7,386,554 B2 | 6/2008 | Ripley et al. |
| 7,389,305 B1 | 6/2008 | Kindig et al. |
| 7,395,273 B2 | 7/2008 | Khan et al. |
| 7,403,942 B1 | 7/2008 | Bayliss |
| 7,421,322 B1 | 9/2008 | Silversmith et al. |
| 7,421,442 B2 | 9/2008 | Gelb et al. |
| 7,424,439 B1 | 9/2008 | Fayyad et al. |
| 7,424,520 B2 | 9/2008 | Daswani et al. |
| 7,433,864 B2 | 10/2008 | Malik |
| 7,451,113 B1 | 11/2008 | Kasower |
| 7,460,857 B2 | 12/2008 | Roach, Jr. |
| 7,467,127 B1 | 12/2008 | Baccash et al. |
| 7,467,401 B2 | 12/2008 | Cicchitto |
| 7,475,118 B2 | 1/2009 | Leiba et al. |
| 7,478,157 B2 | 1/2009 | Bohrer et al. |
| 7,483,842 B1 | 1/2009 | Fung et al. |
| 7,490,356 B2 | 2/2009 | Lieblich et al. |
| 7,505,938 B2 | 3/2009 | Lang et al. |
| 7,529,698 B2 | 5/2009 | Joao |
| 7,533,179 B2 | 5/2009 | Tarquini et al. |
| 7,536,346 B2 | 5/2009 | Aliffi et al. |
| 7,543,739 B2 | 6/2009 | Brown et al. |
| 7,546,266 B2 | 6/2009 | Beirne et al. |
| 7,546,271 B1 | 6/2009 | Chmielewski et al. |
| 7,552,089 B2 | 6/2009 | Bruer et al. |
| 7,552,190 B1 | 6/2009 | Freishtat et al. |
| 7,556,192 B2 | 7/2009 | Wokaty, Jr. |
| 7,559,217 B2 | 7/2009 | Bass |
| 7,562,093 B2 | 7/2009 | Gelb et al. |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,577,934 B2 | 8/2009 | Anonsen et al. |
| 7,580,884 B2 | 8/2009 | Cook |
| 7,584,126 B1 | 9/2009 | White |
| 7,584,146 B1 | 9/2009 | Duhon |
| 7,584,197 B2 | 9/2009 | Dant |
| 7,587,366 B2 | 9/2009 | Grim, III et al. |
| 7,593,889 B2 | 9/2009 | Raines et al. |
| 7,596,512 B1 | 9/2009 | Raines et al. |
| 7,596,716 B2 | 9/2009 | Frost et al. |
| 7,603,701 B2 | 10/2009 | Gaucas |
| 7,606,725 B2 | 10/2009 | Robertson et al. |
| 7,613,600 B2 | 11/2009 | Krane |
| 7,613,671 B2 | 11/2009 | Serrano-Morales et al. |
| 7,634,737 B2 | 12/2009 | Beringer et al. |
| 7,640,200 B2 | 12/2009 | Gardner et al. |
| 7,647,344 B2 | 1/2010 | Skurtovich, Jr. et al. |
| 7,653,592 B1 | 1/2010 | Flaxman et al. |
| 7,653,688 B2 | 1/2010 | Bittner |
| 7,657,540 B1 | 2/2010 | Bayliss |
| 7,668,840 B2 | 2/2010 | Bayliss et al. |
| 7,672,833 B2 | 3/2010 | Blume et al. |
| 7,672,879 B1 | 3/2010 | Kumar et al. |
| 7,672,924 B1 | 3/2010 | Scheurich et al. |
| 7,672,926 B2 | 3/2010 | Ghazal et al. |
| 7,676,751 B2 | 3/2010 | Allen et al. |
| 7,685,209 B1 | 3/2010 | Norton et al. |
| 7,689,505 B2 | 3/2010 | Kasower |
| 7,689,506 B2 | 3/2010 | Fei et al. |
| 7,689,526 B2 | 3/2010 | Byrnes et al. |
| 7,698,163 B2 | 4/2010 | Reed et al. |
| 7,698,445 B2 | 4/2010 | Fitzpatrick et al. |
| 7,707,059 B2 | 4/2010 | Reed et al. |
| 7,707,164 B2 | 4/2010 | Kapochunas et al. |
| 7,707,271 B2 | 4/2010 | Rudkin et al. |
| 7,711,635 B2 | 5/2010 | Steele et al. |
| 7,720,846 B1 | 5/2010 | Bayliss |
| 7,730,078 B2 | 6/2010 | Schwabe et al. |
| 7,739,139 B2 | 6/2010 | Robertson et al. |
| 7,742,982 B2 | 6/2010 | Chaudhuri et al. |
| 7,747,480 B1 | 6/2010 | Agresta et al. |
| 7,747,559 B2 | 6/2010 | Leitner et al. |
| 7,752,236 B2 | 7/2010 | Williams et al. |
| 7,752,535 B2 | 7/2010 | Satyavolu |
| 7,756,789 B2 | 7/2010 | Welker et al. |
| 7,765,166 B2 | 7/2010 | Beringer et al. |
| 7,765,279 B1 | 7/2010 | Kaib et al. |
| 7,765,311 B2 | 7/2010 | Itabashi et al. |
| 7,769,696 B2 | 8/2010 | Yoda |
| 7,769,998 B2 | 8/2010 | Lynch et al. |
| 7,774,270 B1 | 8/2010 | MacCloskey |
| 7,783,515 B1 | 8/2010 | Kumar et al. |
| 7,788,040 B2 | 8/2010 | Haskell et al. |
| 7,797,252 B2 | 9/2010 | Rosskamm et al. |
| 7,797,725 B2 | 9/2010 | Lunt et al. |
| 7,801,812 B2 | 9/2010 | Conlin et al. |
| 7,801,956 B1 | 9/2010 | Cumberbatch et al. |
| 7,810,036 B2 | 10/2010 | Bales et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,818,231 B2 | 10/2010 | Rajan |
| 7,830,382 B2 | 11/2010 | Cirit et al. |
| 7,832,006 B2 | 11/2010 | Chen et al. |
| 7,836,111 B1 | 11/2010 | Shan |
| 7,841,008 B1 | 11/2010 | Cole et al. |
| 7,844,604 B2 | 11/2010 | Baio et al. |
| 7,853,518 B2 | 12/2010 | Cagan |

(56) References Cited

U.S. PATENT DOCUMENTS

| | | |
|---|---|---|
| 7,870,151 B2 | 1/2011 | Mayer et al. |
| 7,873,677 B2 | 1/2011 | Messing et al. |
| 7,877,304 B1 | 1/2011 | Coulter |
| 7,895,139 B2 | 2/2011 | Sullivan et al. |
| 7,908,242 B1 | 3/2011 | Achanta |
| 7,912,842 B1 | 3/2011 | Bayliss et al. |
| 7,912,865 B2 | 3/2011 | Akerman et al. |
| 7,930,242 B2 | 4/2011 | Morris et al. |
| 7,958,126 B2 | 6/2011 | Schachter |
| 7,975,299 B1 | 7/2011 | Balducci et al. |
| 7,983,932 B2 | 7/2011 | Kane |
| 7,991,688 B2 | 8/2011 | Phelan et al. |
| 7,991,901 B2 | 8/2011 | Tarquini et al. |
| 7,996,912 B2 | 8/2011 | Spalink et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,015,614 B2 | 9/2011 | Matsuzaki et al. |
| 8,019,843 B2 | 9/2011 | Cash et al. |
| 8,024,264 B2 | 9/2011 | Chaudhuri et al. |
| 8,024,778 B2 | 9/2011 | Cash et al. |
| 8,060,423 B1 | 11/2011 | Rukonic et al. |
| 8,060,424 B2 | 11/2011 | Kasower |
| 8,060,502 B2 | 11/2011 | Churi et al. |
| 8,060,541 B2 | 11/2011 | Dant |
| 8,064,586 B2 | 11/2011 | Shaffer et al. |
| 8,065,233 B2 | 11/2011 | Lee et al. |
| 8,065,264 B1 | 11/2011 | Achanta |
| 8,095,458 B2 | 1/2012 | Peterson et al. |
| 8,099,341 B2 | 1/2012 | Varghese |
| 8,104,679 B2 | 1/2012 | Brown |
| 8,127,986 B1 | 3/2012 | Taylor et al. |
| 8,131,777 B2 | 3/2012 | McCullouch |
| 8,160,960 B1 | 4/2012 | Fei et al. |
| 8,161,104 B2 | 4/2012 | Tomkow |
| 8,170,998 B2 | 5/2012 | Churi et al. |
| 8,175,889 B1 | 5/2012 | Girulat et al. |
| 8,180,654 B2 | 5/2012 | Berkman et al. |
| 8,190,629 B2 | 5/2012 | Wu et al. |
| 8,190,998 B2 | 5/2012 | Bitterlich |
| 8,201,257 B1 | 6/2012 | Andres et al. |
| 8,214,238 B1 | 7/2012 | Fairfield et al. |
| 8,219,535 B1 | 7/2012 | Kobori et al. |
| 8,219,771 B2 | 7/2012 | Le Neel |
| 8,224,723 B2 | 7/2012 | Bosch et al. |
| 8,234,498 B2 | 7/2012 | Britti et al. |
| 8,239,130 B1 | 8/2012 | Upstill et al. |
| 8,244,635 B2 | 8/2012 | Freishtat et al. |
| 8,255,978 B2 | 8/2012 | Dick |
| 8,266,065 B2 | 9/2012 | Dilip et al. |
| 8,266,168 B2 | 9/2012 | Bayliss |
| 8,266,515 B2 | 9/2012 | Satyavolu |
| 8,271,378 B2 | 9/2012 | Chaudhuri et al. |
| 8,280,805 B1 | 10/2012 | Abrahams et al. |
| 8,285,656 B1 | 10/2012 | Chang et al. |
| 8,296,229 B1 | 10/2012 | Yellin et al. |
| 8,306,986 B2 | 11/2012 | Routson et al. |
| 8,312,033 B1 | 11/2012 | McMillan |
| 8,321,339 B2 | 11/2012 | Imrey et al. |
| 8,321,952 B2 | 11/2012 | Spalink et al. |
| 8,326,672 B2 | 12/2012 | Haggerty et al. |
| 8,326,725 B2 | 12/2012 | Elwell et al. |
| 8,340,685 B2 | 12/2012 | Cochran et al. |
| 8,345,790 B2 | 1/2013 | Sartori et al. |
| 8,359,210 B1 | 1/2013 | Altinger et al. |
| 8,364,518 B1 | 1/2013 | Blake et al. |
| 8,370,371 B1 | 2/2013 | Moncla et al. |
| 8,380,590 B1 | 2/2013 | Rukonic et al. |
| 8,386,377 B1 | 2/2013 | Xiong et al. |
| 8,392,334 B2 | 3/2013 | Hirtenstein et al. |
| 8,433,512 B1 | 4/2013 | Lopatenko et al. |
| 8,458,074 B2 | 6/2013 | Showalter |
| 8,463,919 B2 | 6/2013 | Tarquini et al. |
| 8,464,046 B1 | 6/2013 | Kragh |
| 8,468,198 B2 | 6/2013 | Tomkow |
| 8,473,354 B2 | 6/2013 | Psota et al. |
| 8,478,674 B1 | 7/2013 | Kapczynski et al. |
| 8,484,211 B2 | 7/2013 | Bayliss |
| 8,495,077 B2 | 7/2013 | Bayliss |
| 8,495,384 B1 | 7/2013 | DeLuccia |
| 8,498,930 B2 | 7/2013 | Chung et al. |
| 8,504,456 B2 | 8/2013 | Griffin et al. |
| 8,504,470 B1 | 8/2013 | Chirehdast |
| 8,510,184 B2 | 8/2013 | Imrev et al. |
| 8,510,189 B2 | 8/2013 | Imrey et al. |
| 8,515,828 B1 | 8/2013 | Wolf et al. |
| 8,515,862 B2 | 8/2013 | Zhang et al. |
| 8,521,628 B1 | 8/2013 | Gowen et al. |
| 8,521,729 B2 | 8/2013 | Churi et al. |
| 8,538,980 B1 | 9/2013 | MacKenzie |
| 8,549,472 B1 | 10/2013 | Tilwani |
| 8,560,434 B2 | 10/2013 | Morris et al. |
| 8,560,436 B2 | 10/2013 | Ingram et al. |
| 8,566,029 B1 | 10/2013 | Lopatenko et al. |
| 8,566,141 B1 | 10/2013 | Nagdev et al. |
| 8,572,083 B1 | 10/2013 | Snell et al. |
| 8,583,593 B1 | 11/2013 | Achanta |
| 8,589,069 B1 | 11/2013 | Lehman |
| 8,589,208 B2 | 11/2013 | Kruger et al. |
| 8,600,854 B2 | 12/2013 | Mayr et al. |
| 8,606,666 B1 | 12/2013 | Courbage et al. |
| 8,620,579 B1 | 12/2013 | Upstill et al. |
| 8,626,618 B2 | 1/2014 | Psota et al. |
| 8,631,242 B2 | 1/2014 | Britti et al. |
| 8,639,616 B1 | 1/2014 | Rolenaitis et al. |
| 8,639,920 B2 | 1/2014 | Stack et al. |
| 8,650,407 B2 | 2/2014 | Britti et al. |
| 8,660,943 B1 | 2/2014 | Chirehdast |
| 8,671,115 B2 | 3/2014 | Skurtovich, Jr. et al. |
| 8,677,129 B2 | 3/2014 | Milana et al. |
| 8,694,390 B2 | 4/2014 | Imrey et al. |
| 8,694,502 B2 | 4/2014 | Bayliss |
| 8,705,718 B2 | 4/2014 | Baniak et al. |
| 8,706,474 B2 | 4/2014 | Blume et al. |
| 8,725,613 B1 | 5/2014 | Celka et al. |
| 8,732,004 B1 | 5/2014 | Ramos et al. |
| 8,738,515 B2 | 5/2014 | Chaudhuri et al. |
| 8,738,516 B1 | 5/2014 | Dean et al. |
| 8,762,053 B1 | 6/2014 | Lehman |
| 8,768,826 B2 | 7/2014 | Imrey et al. |
| 8,768,914 B2 | 7/2014 | Scriffignano et al. |
| 8,775,299 B2 | 7/2014 | Achanta et al. |
| 8,781,877 B2 | 7/2014 | Kruger et al. |
| 8,781,882 B1 | 7/2014 | Arboletti et al. |
| 8,781,953 B2 | 7/2014 | Kasower |
| 8,782,217 B1 | 7/2014 | Arone et al. |
| 8,788,701 B1 | 7/2014 | Byrnes et al. |
| 8,805,805 B1 | 8/2014 | Kobori et al. |
| 8,818,888 B1 | 8/2014 | Kapczynski et al. |
| 8,825,544 B2 | 9/2014 | Imrey et al. |
| 8,862,566 B2 | 10/2014 | Leitner et al. |
| 8,903,741 B2 | 12/2014 | Imrey et al. |
| 8,938,432 B2 | 1/2015 | Rossmark et al. |
| 8,949,981 B1 | 2/2015 | Trollope et al. |
| 8,954,459 B1 | 2/2015 | McMillan et al. |
| 8,965,934 B2 | 2/2015 | Prieditis |
| 8,966,649 B2 | 2/2015 | Stack et al. |
| 8,972,400 B1 | 3/2015 | Kapczynski et al. |
| 9,009,132 B2 | 4/2015 | Camper |
| 9,015,171 B2 | 4/2015 | Bayliss |
| 9,020,971 B2 | 4/2015 | Bayliss et al. |
| 9,057,616 B2 | 6/2015 | Lopatenko et al. |
| 9,057,617 B1 | 6/2015 | Lopatenko et al. |
| 9,075,848 B2 | 7/2015 | Churi et al. |
| 9,116,918 B1 | 8/2015 | Kim |
| 9,143,541 B1 | 9/2015 | Szamonek et al. |
| 9,147,042 B1 | 9/2015 | Haller et al. |
| 9,152,727 B1 | 10/2015 | Balducci et al. |
| 9,165,044 B2 | 10/2015 | Psenka et al. |
| 9,256,624 B2 | 2/2016 | Skurtovich, Jr. et al. |
| 9,268,803 B2 | 2/2016 | Kapochunas et al. |
| 9,305,300 B2 | 4/2016 | Mulhern et al. |
| 9,324,087 B2 | 4/2016 | Routson et al. |
| 9,342,783 B1 | 5/2016 | Chang et al. |

(56) References Cited

U.S. PATENT DOCUMENTS

| | | |
|---|---|---|
| 9,438,570 B2 | 9/2016 | Milana et al. |
| 9,449,346 B1 | 9/2016 | Hockey et al. |
| 9,529,851 B1 | 12/2016 | Smith |
| 9,535,959 B2 | 1/2017 | Sun et al. |
| 9,553,936 B2 | 1/2017 | Dijk et al. |
| 9,595,023 B1 | 3/2017 | Hockey et al. |
| 9,595,051 B2 | 3/2017 | Stack et al. |
| 9,636,053 B2 | 5/2017 | Peterson et al. |
| 9,646,058 B2 | 5/2017 | Churi et al. |
| 9,684,905 B1 | 6/2017 | Haller et al. |
| 9,705,863 B2 | 7/2017 | Britti et al. |
| 9,710,523 B2 | 7/2017 | Skurtovich, Jr. et al. |
| 9,710,852 B1 | 7/2017 | Olson et al. |
| 9,774,681 B2 | 9/2017 | Zoldi et al. |
| 9,866,561 B2 | 1/2018 | Psenka et al. |
| 9,955,003 B2 | 4/2018 | Cody et al. |
| 9,989,501 B2 | 6/2018 | Tat et al. |
| 10,003,591 B2 | 6/2018 | Hockey et al. |
| 10,075,446 B2 | 9/2018 | McMillan et al. |
| 10,102,536 B1 | 10/2018 | Hickman et al. |
| 10,104,059 B2 | 10/2018 | Hockey et al. |
| 10,108,818 B2 | 10/2018 | Curcio et al. |
| 10,115,102 B2 | 10/2018 | Burrell et al. |
| 10,117,609 B2 | 11/2018 | Peterson et al. |
| 10,180,861 B2 | 1/2019 | Raghavan et al. |
| 10,262,362 B1 | 4/2019 | Hu et al. |
| 10,282,790 B1 | 5/2019 | Kolbrener et al. |
| 10,319,029 B1 | 6/2019 | Hockey et al. |
| 10,339,330 B2 | 7/2019 | Riley et al. |
| 10,367,888 B2 | 7/2019 | Zoldi et al. |
| 10,380,654 B2 | 8/2019 | Hirtenstein et al. |
| 10,437,895 B2 | 10/2019 | Chang et al. |
| 10,503,798 B2 | 12/2019 | Chen et al. |
| 10,515,084 B2 | 12/2019 | Sun et al. |
| 10,523,653 B2 | 12/2019 | Hockey et al. |
| 10,530,761 B2 | 1/2020 | Hockey et al. |
| 10,547,739 B2 | 1/2020 | Cody et al. |
| 10,580,025 B2 | 3/2020 | Hickman et al. |
| 10,580,724 B2 | 3/2020 | Britti et al. |
| 10,614,463 B1 | 4/2020 | Hockey et al. |
| 10,691,825 B2 | 6/2020 | Jones et al. |
| 10,693,840 B2 | 6/2020 | Peterson et al. |
| 10,726,491 B1 | 7/2020 | Hockey et al. |
| 10,810,218 B2 | 10/2020 | Ng et al. |
| 10,885,139 B2 | 1/2021 | Chen et al. |
| 10,887,457 B1 | 1/2021 | Degeorgis et al. |
| 10,963,434 B1 | 3/2021 | Rodriguez et al. |
| 10,979,560 B2 | 4/2021 | Cody et al. |
| 11,042,662 B2 | 6/2021 | Riley et al. |
| 11,061,874 B1 * | 7/2021 | Funk ............... G06F 16/2468 |
| 11,107,158 B1 | 8/2021 | Hu et al. |
| 11,157,872 B2 | 10/2021 | McMillan et al. |
| 11,163,943 B2 | 11/2021 | Billman et al. |
| 11,227,001 B2 | 1/2022 | Rege et al. |
| 11,263,218 B2 | 3/2022 | Pieniazek et al. |
| 11,270,275 B2 | 3/2022 | Anderson et al. |
| 11,308,170 B2 | 4/2022 | Chang et al. |
| 11,328,083 B2 | 5/2022 | Jones et al. |
| 11,443,316 B2 | 9/2022 | Burrell et al. |
| 11,461,383 B2 | 10/2022 | Xie et al. |
| 11,468,186 B2 | 10/2022 | Dong et al. |
| 11,487,897 B2 | 11/2022 | Pieniazek et al. |
| 11,516,339 B2 | 11/2022 | Degeorgis et al. |
| 2001/0000536 A1 | 4/2001 | Tarin |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0034631 A1 | 10/2001 | Kiselik |
| 2001/0037332 A1 | 11/2001 | Miller et al. |
| 2001/0039532 A1 | 11/2001 | Coleman, Jr. et al. |
| 2001/0049274 A1 | 12/2001 | Degraeve |
| 2001/0049620 A1 | 12/2001 | Blasko |
| 2002/0004736 A1 | 1/2002 | Roundtree et al. |
| 2002/0010664 A1 | 1/2002 | Rabideau et al. |
| 2002/0010701 A1 | 1/2002 | Kosciuszko |
| 2002/0013827 A1 | 1/2002 | Edstrom et al. |
| 2002/0026507 A1 | 2/2002 | Sears et al. |
| 2002/0026519 A1 | 2/2002 | Itabashi et al. |
| 2002/0033846 A1 | 3/2002 | Balasubramanian et al. |
| 2002/0049701 A1 | 4/2002 | Nabe et al. |
| 2002/0049738 A1 | 4/2002 | Epstein |
| 2002/0052884 A1 | 5/2002 | Farber et al. |
| 2002/0069122 A1 | 6/2002 | Yun et al. |
| 2002/0077964 A1 | 6/2002 | Brody et al. |
| 2002/0091650 A1 | 7/2002 | Ellis |
| 2002/0091706 A1 | 7/2002 | Anderson et al. |
| 2002/0099628 A1 | 7/2002 | Takaoka et al. |
| 2002/0099824 A1 | 7/2002 | Bender et al. |
| 2002/0099936 A1 | 7/2002 | Kou et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111910 A1 | 8/2002 | Walsh |
| 2002/0120757 A1 | 8/2002 | Sutherland et al. |
| 2002/0128962 A1 | 9/2002 | Kasower |
| 2002/0131565 A1 | 9/2002 | Scheuring et al. |
| 2002/0133504 A1 | 9/2002 | Vlahos et al. |
| 2002/0138297 A1 | 9/2002 | Lee |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0156676 A1 | 10/2002 | Ahrens et al. |
| 2002/0161496 A1 | 10/2002 | Yamaki |
| 2002/0161664 A1 | 10/2002 | Shaya et al. |
| 2002/0165757 A1 | 11/2002 | Lisser |
| 2002/0173984 A1 | 11/2002 | Robertson et al. |
| 2002/0184255 A1 | 12/2002 | Edd et al. |
| 2002/0188544 A1 | 12/2002 | Wizon et al. |
| 2002/0198800 A1 | 12/2002 | Shamrakov |
| 2003/0002671 A1 | 1/2003 | Inchalik et al. |
| 2003/0009418 A1 | 1/2003 | Green et al. |
| 2003/0018578 A1 | 1/2003 | Schultz |
| 2003/0023531 A1 | 1/2003 | Fergusson |
| 2003/0041050 A1 | 2/2003 | Smith et al. |
| 2003/0046311 A1 | 3/2003 | Baidya et al. |
| 2003/0050882 A1 | 3/2003 | Degen et al. |
| 2003/0055931 A1 | 3/2003 | Cravo De Almeida et al. |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0135451 A1 | 7/2003 | O'Brien et al. |
| 2003/0153299 A1 | 8/2003 | Perfit et al. |
| 2003/0158749 A1 | 8/2003 | Olchanski et al. |
| 2003/0158776 A1 | 8/2003 | Landesmann |
| 2003/0163513 A1 | 8/2003 | Schaeck et al. |
| 2003/0171942 A1 | 9/2003 | Gaito |
| 2003/0191731 A1 | 10/2003 | Stewart et al. |
| 2003/0200151 A1 | 10/2003 | Ellenson et al. |
| 2003/0204429 A1 | 10/2003 | Botscheck et al. |
| 2003/0208412 A1 | 11/2003 | Hillestad et al. |
| 2003/0212654 A1 | 11/2003 | Harper et al. |
| 2003/0229892 A1 | 12/2003 | Sardera |
| 2004/0006488 A1 | 1/2004 | Fitall et al. |
| 2004/0010458 A1 | 1/2004 | Friedman |
| 2004/0019799 A1 | 1/2004 | Vering et al. |
| 2004/0030649 A1 | 2/2004 | Nelson et al. |
| 2004/0044673 A1 | 3/2004 | Brady et al. |
| 2004/0052357 A1 | 3/2004 | Logan et al. |
| 2004/0083215 A1 | 4/2004 | de Jong |
| 2004/0083482 A1 | 4/2004 | Makagon et al. |
| 2004/0088237 A1 | 5/2004 | Moenickheim et al. |
| 2004/0088255 A1 | 5/2004 | Zielke et al. |
| 2004/0098625 A1 | 5/2004 | Lagadec et al. |
| 2004/0103147 A1 | 5/2004 | Flesher et al. |
| 2004/0107250 A1 | 6/2004 | Marciano |
| 2004/0111359 A1 | 6/2004 | Hudock |
| 2004/0117358 A1 | 6/2004 | Von Kaenel et al. |
| 2004/0122696 A1 | 6/2004 | Beringer |

(56) References Cited

U.S. PATENT DOCUMENTS

| | | |
|---|---|---|
| 2004/0128150 A1 | 7/2004 | Lundegren |
| 2004/0128156 A1 | 7/2004 | Beringer et al. |
| 2004/0128227 A1 | 7/2004 | Whipple et al. |
| 2004/0128230 A1 | 7/2004 | Oppenheimer et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0153448 A1 | 8/2004 | Cheng et al. |
| 2004/0153521 A1 | 8/2004 | Kogo |
| 2004/0176995 A1 | 9/2004 | Fusz |
| 2004/0193538 A1 | 9/2004 | Raines |
| 2004/0199456 A1 | 10/2004 | Flint et al. |
| 2004/0199789 A1 | 10/2004 | Shaw et al. |
| 2004/0204948 A1 | 10/2004 | Singletary et al. |
| 2004/0220865 A1 | 11/2004 | Lozowski et al. |
| 2004/0220896 A1 | 11/2004 | Finlay et al. |
| 2004/0220918 A1 | 11/2004 | Scriffignano et al. |
| 2004/0221043 A1 | 11/2004 | Su et al. |
| 2004/0225099 A1 | 11/2004 | Hohberg et al. |
| 2004/0225594 A1 | 11/2004 | Nolan, III et al. |
| 2004/0225596 A1 | 11/2004 | Kemper et al. |
| 2004/0225643 A1 | 11/2004 | Alpha et al. |
| 2004/0230534 A1 | 11/2004 | McGough |
| 2004/0243588 A1 | 12/2004 | Tanner et al. |
| 2004/0254935 A1 | 12/2004 | Chagoly et al. |
| 2004/0267714 A1 | 12/2004 | Frid et al. |
| 2005/0010513 A1 | 1/2005 | Duckworth et al. |
| 2005/0010555 A1 | 1/2005 | Gallivan |
| 2005/0027995 A1 | 2/2005 | Menschik et al. |
| 2005/0038737 A1 | 2/2005 | Norris |
| 2005/0049991 A1 | 3/2005 | Aggarwal |
| 2005/0055231 A1 | 3/2005 | Lee |
| 2005/0060332 A1 | 3/2005 | Bernstein et al. |
| 2005/0071328 A1 | 3/2005 | Lawrence |
| 2005/0086261 A1 | 4/2005 | Mammone |
| 2005/0091164 A1 | 4/2005 | Varble |
| 2005/0097039 A1 | 5/2005 | Kulcsar et al. |
| 2005/0102180 A1 | 5/2005 | Gailey et al. |
| 2005/0108396 A1 | 5/2005 | Bittner |
| 2005/0108631 A1 | 5/2005 | Amorin et al. |
| 2005/0113991 A1 | 5/2005 | Rogers et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0137899 A1 | 6/2005 | Davies et al. |
| 2005/0154664 A1 | 7/2005 | Guy et al. |
| 2005/0154769 A1 | 7/2005 | Eckart et al. |
| 2005/0187948 A1 | 8/2005 | Monitzer et al. |
| 2005/0192008 A1 | 9/2005 | Desai et al. |
| 2005/0193093 A1 | 9/2005 | Mathew et al. |
| 2005/0197953 A1 | 9/2005 | Broadbent et al. |
| 2005/0208461 A1 | 9/2005 | Krebs et al. |
| 2005/0226224 A1 | 10/2005 | Lee et al. |
| 2005/0246338 A1 | 11/2005 | Bird |
| 2005/0257250 A1 | 11/2005 | Mitchell et al. |
| 2005/0262158 A1 | 11/2005 | Sauermann |
| 2005/0273849 A1 | 12/2005 | Araujo et al. |
| 2005/0288998 A1 | 12/2005 | Verma et al. |
| 2005/0289003 A1 | 12/2005 | Thompson et al. |
| 2006/0015425 A1 | 1/2006 | Brooks |
| 2006/0020611 A1 | 1/2006 | Gilbert et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041670 A1 | 2/2006 | Musseleck et al. |
| 2006/0069635 A1 | 3/2006 | Ram et al. |
| 2006/0074991 A1 | 4/2006 | Lussier et al. |
| 2006/0079211 A1 | 4/2006 | Degraeve |
| 2006/0080233 A1 | 4/2006 | Mendelovich et al. |
| 2006/0080251 A1 | 4/2006 | Fried et al. |
| 2006/0085361 A1 | 4/2006 | Hoerle et al. |
| 2006/0085454 A1 | 4/2006 | Blegen et al. |
| 2006/0129419 A1 | 6/2006 | Flaxer et al. |
| 2006/0136330 A1 | 6/2006 | DeRoy et al. |
| 2006/0136595 A1 | 6/2006 | Satyavolu |
| 2006/0149674 A1 | 7/2006 | Cook et al. |
| 2006/0155573 A1 | 7/2006 | Hartunian |
| 2006/0155780 A1 | 7/2006 | Sakairi et al. |
| 2006/0161554 A1 | 7/2006 | Lucovsky et al. |
| 2006/0179050 A1 | 8/2006 | Giang et al. |
| 2006/0184440 A1 | 8/2006 | Britti et al. |
| 2006/0184585 A1 | 8/2006 | Grear et al. |
| 2006/0195688 A1 | 8/2006 | Drissi et al. |
| 2006/0235935 A1 | 10/2006 | Ng |
| 2006/0241923 A1 | 10/2006 | Xu et al. |
| 2006/0242047 A1 | 10/2006 | Haggerty et al. |
| 2006/0267999 A1 | 11/2006 | Cash et al. |
| 2006/0276171 A1 | 12/2006 | Pousti |
| 2006/0277089 A1 | 12/2006 | Hubbard et al. |
| 2006/0277092 A1 | 12/2006 | Williams |
| 2006/0277141 A1 | 12/2006 | Palmer |
| 2006/0282359 A1 | 12/2006 | Nobili et al. |
| 2006/0282429 A1 | 12/2006 | Hernandez-Sherrington et al. |
| 2006/0282819 A1 | 12/2006 | Graham et al. |
| 2006/0288090 A1 | 12/2006 | Kraft |
| 2006/0293932 A1 | 12/2006 | Cash et al. |
| 2006/0294199 A1 | 12/2006 | Bertholf |
| 2007/0011020 A1 | 1/2007 | Martin |
| 2007/0011030 A1 | 1/2007 | Bregante et al. |
| 2007/0011032 A1 | 1/2007 | Bregante et al. |
| 2007/0011083 A1 | 1/2007 | Bird et al. |
| 2007/0016517 A1 | 1/2007 | Solomon |
| 2007/0022141 A1 | 1/2007 | Singleton et al. |
| 2007/0027778 A1 | 2/2007 | Schellhammer et al. |
| 2007/0030282 A1 | 2/2007 | Cash et al. |
| 2007/0038483 A1 | 2/2007 | Wood |
| 2007/0038497 A1 | 2/2007 | Britti et al. |
| 2007/0047714 A1 | 3/2007 | Baniak et al. |
| 2007/0067285 A1 | 3/2007 | Blume et al. |
| 2007/0067437 A1 | 3/2007 | Sindambiwe |
| 2007/0094230 A1 | 4/2007 | Subramaniam et al. |
| 2007/0094241 A1 | 4/2007 | M. Blackwell et al. |
| 2007/0094264 A1 | 4/2007 | Nair |
| 2007/0112668 A1 | 5/2007 | Celano et al. |
| 2007/0118393 A1 | 5/2007 | Rosen et al. |
| 2007/0130070 A1 | 6/2007 | Williams |
| 2007/0156554 A1 | 7/2007 | Nikoley et al. |
| 2007/0156589 A1 | 7/2007 | Zimler et al. |
| 2007/0185797 A1 | 8/2007 | Robinson |
| 2007/0204338 A1 | 8/2007 | Aiello et al. |
| 2007/0208640 A1 | 9/2007 | Banasiak et al. |
| 2007/0214000 A1 | 9/2007 | Shahrabi et al. |
| 2007/0220611 A1 | 9/2007 | Socolow et al. |
| 2007/0226010 A1 | 9/2007 | Larsen |
| 2007/0226093 A1 | 9/2007 | Chan et al. |
| 2007/0226129 A1 | 9/2007 | Liao et al. |
| 2007/0244782 A1 | 10/2007 | Chimento |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0282730 A1 | 12/2007 | Carpenter et al. |
| 2007/0282736 A1 | 12/2007 | Conlin et al. |
| 2007/0288360 A1 | 12/2007 | Seeklus |
| 2007/0299759 A1 | 12/2007 | Kelly |
| 2008/0010206 A1 | 1/2008 | Coleman |
| 2008/0021804 A1 | 1/2008 | Deckoff |
| 2008/0027858 A1 | 1/2008 | Benson |
| 2008/0033742 A1 | 2/2008 | Bernasconi |
| 2008/0033750 A1 | 2/2008 | Burriss et al. |
| 2008/0033956 A1 | 2/2008 | Saha et al. |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059449 A1 | 3/2008 | Webster et al. |
| 2008/0072316 A1 | 3/2008 | Chang et al. |
| 2008/0082536 A1 | 4/2008 | Schwabe et al. |
| 2008/0109875 A1 | 5/2008 | Kraft |
| 2008/0115191 A1 | 5/2008 | Kim et al. |
| 2008/0120569 A1 | 5/2008 | Mann et al. |

(56) References Cited

U.S. PATENT DOCUMENTS

| | | |
|---|---|---|
| 2008/0177655 A1 | 7/2008 | Zalik |
| 2008/0183504 A1 | 7/2008 | Highley |
| 2008/0183564 A1 | 7/2008 | Tien et al. |
| 2008/0184270 A1 | 7/2008 | Cole et al. |
| 2008/0195600 A1 | 8/2008 | Deakter |
| 2008/0201401 A1 | 8/2008 | Pugh et al. |
| 2008/0205655 A1 | 8/2008 | Wilkins et al. |
| 2008/0205774 A1 | 8/2008 | Brinker et al. |
| 2008/0208610 A1 | 8/2008 | Thomas et al. |
| 2008/0208631 A1 | 8/2008 | Morita et al. |
| 2008/0208735 A1 | 8/2008 | Balet et al. |
| 2008/0208873 A1 | 8/2008 | Boehmer |
| 2008/0216156 A1 | 9/2008 | Kosaka |
| 2008/0244008 A1 | 10/2008 | Wilkinson et al. |
| 2008/0249869 A1 | 10/2008 | Angell et al. |
| 2008/0263058 A1 | 10/2008 | Peden |
| 2008/0270209 A1 | 10/2008 | Mauseth et al. |
| 2008/0270294 A1 | 10/2008 | Lent et al. |
| 2008/0288283 A1 | 11/2008 | Baldwin, Jr. et al. |
| 2008/0294540 A1 | 11/2008 | Celka et al. |
| 2008/0301016 A1 | 12/2008 | Durvasula et al. |
| 2008/0301188 A1 | 12/2008 | O'Hara |
| 2008/0306750 A1 | 12/2008 | Wunder et al. |
| 2008/0312969 A1 | 12/2008 | Raines et al. |
| 2008/0319889 A1 | 12/2008 | Hammad |
| 2008/0320575 A1 | 12/2008 | Gelb et al. |
| 2009/0006475 A1 | 1/2009 | Udezue et al. |
| 2009/0018986 A1 | 1/2009 | Alcorn et al. |
| 2009/0018996 A1 | 1/2009 | Hunt et al. |
| 2009/0024428 A1 | 1/2009 | Hudock, Jr. |
| 2009/0024505 A1 | 1/2009 | Patel et al. |
| 2009/0031426 A1 | 1/2009 | Dal Lago et al. |
| 2009/0043691 A1 | 2/2009 | Kasower |
| 2009/0048877 A1 | 2/2009 | Binns et al. |
| 2009/0048957 A1 | 2/2009 | Celano |
| 2009/0055894 A1 | 2/2009 | Lorsch |
| 2009/0060343 A1 | 3/2009 | Rosca |
| 2009/0094064 A1 | 4/2009 | Tyler et al. |
| 2009/0094237 A1 | 4/2009 | Churi et al. |
| 2009/0094674 A1 | 4/2009 | Schwartz et al. |
| 2009/0106846 A1 | 4/2009 | Dupray et al. |
| 2009/0112650 A1 | 4/2009 | Iwane |
| 2009/0113532 A1 | 4/2009 | Lapidous |
| 2009/0119169 A1 | 5/2009 | Chandratillake et al. |
| 2009/0132347 A1 | 5/2009 | Anderson et al. |
| 2009/0138335 A1 | 5/2009 | Lieberman |
| 2009/0144102 A1 | 6/2009 | Lopez |
| 2009/0150166 A1 | 6/2009 | Leite et al. |
| 2009/0150238 A1 | 6/2009 | Marsh et al. |
| 2009/0164232 A1 | 6/2009 | Chmielewski et al. |
| 2009/0164380 A1 | 6/2009 | Brown |
| 2009/0182661 A1 | 7/2009 | Irwin |
| 2009/0183259 A1 | 7/2009 | Rinek et al. |
| 2009/0210807 A1 | 8/2009 | Xiao et al. |
| 2009/0216591 A1 | 8/2009 | Buerger et al. |
| 2009/0216640 A1 | 8/2009 | Masi |
| 2009/0222449 A1 | 9/2009 | Hom et al. |
| 2009/0228918 A1 | 9/2009 | Rolff et al. |
| 2009/0234665 A1 | 9/2009 | Conkel |
| 2009/0234876 A1 | 9/2009 | Schigel et al. |
| 2009/0240609 A1 | 9/2009 | Cho et al. |
| 2009/0249440 A1 | 10/2009 | Platt et al. |
| 2009/0254375 A1 | 10/2009 | Martinez et al. |
| 2009/0254656 A1 | 10/2009 | Vignisson et al. |
| 2009/0254971 A1 | 10/2009 | Herz et al. |
| 2009/0271265 A1 | 10/2009 | Lay et al. |
| 2009/0313049 A1 | 12/2009 | Joao et al. |
| 2009/0313562 A1 | 12/2009 | Appleyard et al. |
| 2009/0327120 A1 | 12/2009 | Eze et al. |
| 2009/0328173 A1 | 12/2009 | Jakobson et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0030578 A1 | 2/2010 | Siddique et al. |
| 2010/0030677 A1 | 2/2010 | Melik-Aslanian et al. |
| 2010/0037299 A1 | 2/2010 | Karasick et al. |
| 2010/0042583 A1 | 2/2010 | Gervais |
| 2010/0049803 A1 | 2/2010 | Ogilvie et al. |
| 2010/0094704 A1 | 4/2010 | Subramanian et al. |
| 2010/0094758 A1 | 4/2010 | Chamberlain et al. |
| 2010/0114724 A1 | 5/2010 | Ghosh et al. |
| 2010/0145836 A1 | 6/2010 | Baker et al. |
| 2010/0153707 A1 | 6/2010 | Lentz, II |
| 2010/0169159 A1 | 7/2010 | Rose et al. |
| 2010/0169264 A1 | 7/2010 | O'Sullivan |
| 2010/0185546 A1 | 7/2010 | Pollard |
| 2010/0188684 A1 | 7/2010 | Kumara |
| 2010/0205076 A1 | 8/2010 | Parson et al. |
| 2010/0211445 A1 | 8/2010 | Bodington |
| 2010/0211636 A1 | 8/2010 | Starkenburg et al. |
| 2010/0217837 A1 | 8/2010 | Ansari et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0268660 A1 | 10/2010 | Ekdahl |
| 2010/0293090 A1 | 11/2010 | Domenikos et al. |
| 2011/0009707 A1 | 1/2011 | Kaundinya et al. |
| 2011/0016042 A1 | 1/2011 | Cho et al. |
| 2011/0023115 A1 | 1/2011 | Wright |
| 2011/0054981 A1 | 3/2011 | Faith et al. |
| 2011/0078073 A1 | 3/2011 | Annappindi et al. |
| 2011/0113084 A1 | 5/2011 | Ramnani |
| 2011/0113086 A1 | 5/2011 | Long et al. |
| 2011/0125595 A1 | 5/2011 | Neal et al. |
| 2011/0126275 A1 | 5/2011 | Anderson et al. |
| 2011/0131131 A1 | 6/2011 | Griffin et al. |
| 2011/0137760 A1 | 6/2011 | Rudie et al. |
| 2011/0137789 A1 | 6/2011 | Kortina et al. |
| 2011/0142213 A1 | 6/2011 | Baniak et al. |
| 2011/0161218 A1 | 6/2011 | Swift |
| 2011/0164746 A1 | 7/2011 | Nice et al. |
| 2011/0166988 A1 | 7/2011 | Coulter |
| 2011/0178899 A1 | 7/2011 | Huszar |
| 2011/0178922 A1 | 7/2011 | Imrey et al. |
| 2011/0179139 A1 | 7/2011 | Starkenburg et al. |
| 2011/0184838 A1 | 7/2011 | Winters et al. |
| 2011/0196791 A1 | 8/2011 | Dominguez |
| 2011/0202474 A1 | 8/2011 | Mele et al. |
| 2011/0211445 A1 | 9/2011 | Chen |
| 2011/0219421 A1 | 9/2011 | Ullman et al. |
| 2011/0238566 A1 | 9/2011 | Santos |
| 2011/0258050 A1 | 10/2011 | Chan et al. |
| 2011/0264566 A1 | 10/2011 | Brown |
| 2012/0011056 A1 | 1/2012 | Ward et al. |
| 2012/0029956 A1 | 2/2012 | Ghosh et al. |
| 2012/0030216 A1 | 2/2012 | Churi et al. |
| 2012/0030771 A1 | 2/2012 | Pierson et al. |
| 2012/0054592 A1 | 3/2012 | Jaffe et al. |
| 2012/0066065 A1 | 3/2012 | Switzer |
| 2012/0072464 A1 | 3/2012 | Cohen |
| 2012/0101939 A1 | 4/2012 | Kasower |
| 2012/0106801 A1 | 5/2012 | Jackson |
| 2012/0109990 A1 | 5/2012 | Yamasaki |
| 2012/0110467 A1 | 5/2012 | Blake et al. |
| 2012/0117509 A1 | 5/2012 | Powell et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0158460 A1 | 6/2012 | Kruger et al. |
| 2012/0158654 A1 | 6/2012 | Behren et al. |
| 2012/0173339 A1 | 7/2012 | Flynt et al. |
| 2012/0179536 A1 | 7/2012 | Kalb et al. |
| 2012/0198556 A1 | 8/2012 | Patel et al. |
| 2012/0215682 A1 | 8/2012 | Lent et al. |
| 2012/0216125 A1 | 8/2012 | Pierce |
| 2012/0226916 A1 | 9/2012 | Hahn et al. |
| 2012/0232958 A1 | 9/2012 | Silbert |
| 2012/0265607 A1 | 10/2012 | Belwadi |
| 2012/0278227 A1 | 11/2012 | Kolo et al. |
| 2012/0284118 A1 | 11/2012 | Mamich, Jr. et al. |
| 2012/0290660 A1 | 11/2012 | Rao et al. |

(56) References Cited

U.S. PATENT DOCUMENTS

| | | |
|---|---|---|
| 2013/0031109 A1 | 1/2013 | Roulson et al. |
| 2013/0031113 A1 | 1/2013 | Feng et al. |
| 2013/0124263 A1 | 5/2013 | Amaro et al. |
| 2013/0125010 A1 | 5/2013 | Strandell |
| 2013/0132151 A1 | 5/2013 | Stibel et al. |
| 2013/0159168 A1 | 6/2013 | Evans |
| 2013/0173447 A1 | 7/2013 | Rothschild |
| 2013/0185293 A1 | 7/2013 | Boback |
| 2013/0226783 A1 | 8/2013 | Haggerty et al. |
| 2013/0268357 A1 | 10/2013 | Heath |
| 2013/0279676 A1 | 10/2013 | Baniak et al. |
| 2013/0293363 A1 | 11/2013 | Plymouth |
| 2013/0332338 A1 | 12/2013 | Yan et al. |
| 2013/0332467 A1 | 12/2013 | Bornea et al. |
| 2014/0025562 A1 | 1/2014 | Rothrock et al. |
| 2014/0032265 A1 | 1/2014 | Paprocki et al. |
| 2014/0032300 A1 | 1/2014 | Zhang et al. |
| 2014/0040182 A1 | 2/2014 | Gilder et al. |
| 2014/0074689 A1 | 3/2014 | Lund et al. |
| 2014/0136422 A1 | 5/2014 | Jung et al. |
| 2014/0164112 A1 | 6/2014 | Kala |
| 2014/0164519 A1 | 6/2014 | Shah |
| 2014/0172687 A1 | 6/2014 | Chirehdast |
| 2014/0244353 A1 | 8/2014 | Winters |
| 2014/0279329 A1 | 9/2014 | Dancel |
| 2014/0304263 A1 | 10/2014 | Vaitheeswaran et al. |
| 2014/0316969 A1 | 10/2014 | Imrey |
| 2014/0324655 A1 | 10/2014 | Kolathur |
| 2015/0066772 A1 | 3/2015 | Griffin et al. |
| 2015/0254329 A1 | 9/2015 | Agarwal et al. |
| 2015/0278277 A1 | 10/2015 | Agrawal et al. |
| 2015/0287091 A1 | 10/2015 | Koran |
| 2016/0004728 A1 | 1/2016 | Balet et al. |
| 2016/0048700 A1 | 2/2016 | Stransky-Heilkron |
| 2016/0227037 A1 | 8/2016 | Roybal et al. |
| 2016/0342999 A1 | 11/2016 | Rouston et al. |
| 2017/0098096 A1 | 4/2017 | Redberg |
| 2017/0177809 A1 | 6/2017 | Bull et al. |
| 2017/0249481 A1 | 8/2017 | Edison |
| 2017/0262821 A1 | 9/2017 | Imrey et al. |
| 2018/0075527 A1 | 3/2018 | Nagla et al. |
| 2018/0089379 A1 | 3/2018 | Collins et al. |
| 2018/0121520 A1* | 5/2018 | Degiere ............... H04L 51/04 |
| 2018/0150599 A1 | 5/2018 | Valdes et al. |
| 2018/0181646 A1* | 6/2018 | Balasa ............... G06F 16/288 |
| 2018/0218069 A1 | 8/2018 | Rege et al. |
| 2018/0253702 A1 | 9/2018 | Dowding |
| 2018/0276222 A1 | 9/2018 | Belknap et al. |
| 2018/0330516 A1 | 11/2018 | Baca et al. |
| 2019/0065516 A1 | 2/2019 | Barker |
| 2019/0188717 A1 | 6/2019 | Putnam et al. |
| 2019/0318122 A1 | 10/2019 | Hockey et al. |
| 2019/0356672 A1 | 11/2019 | Bondugula et al. |
| 2020/0074109 A1 | 3/2020 | Pieniazek et al. |
| 2020/0106764 A1 | 4/2020 | Hockey et al. |
| 2020/0106765 A1 | 4/2020 | Hockey et al. |
| 2020/0201878 A1 | 6/2020 | Putnam et al. |
| 2020/0210492 A1 | 7/2020 | Chang et al. |
| 2020/0213206 A1 | 7/2020 | Bracken et al. |
| 2020/0265155 A1 | 8/2020 | Dong et al. |
| 2020/0279053 A1 | 9/2020 | Jones et al. |
| 2020/0327150 A1 | 10/2020 | Kunjur et al. |
| 2020/0327560 A1 | 10/2020 | Anderson et al. |
| 2020/0364246 A1 | 11/2020 | Farrell |
| 2020/0387634 A1 | 12/2020 | Jones et al. |
| 2020/0394675 A1 | 12/2020 | Bradford |
| 2021/0004373 A1 | 1/2021 | Sankaran et al. |
| 2021/0034613 A1 | 2/2021 | Ng et al. |
| 2021/0042366 A1 | 2/2021 | Hicklin et al. |
| 2021/0064725 A1 | 3/2021 | Miller et al. |
| 2021/0158299 A1 | 5/2021 | Baggett |
| 2021/0158368 A1 | 5/2021 | Baggett |
| 2021/0357707 A1 | 11/2021 | Bondugula et al. |
| 2021/0400120 A1 | 12/2021 | Prieditis |
| 2022/0019733 A1 | 1/2022 | Billman et al. |
| 2022/0027853 A1 | 1/2022 | McMillan et al. |
| 2022/0070294 A1 | 3/2022 | Cody et al. |
| 2022/0138238 A1 | 5/2022 | Rege et al. |
| 2022/0156394 A1 | 5/2022 | Riley et al. |
| 2022/0222368 A1 | 7/2022 | Min et al. |
| 2022/0391435 A1 | 12/2022 | Xie et al. |
| 2023/0014257 A1 | 1/2023 | Dong et al. |

FOREIGN PATENT DOCUMENTS

| | | |
|---|---|---|
| AU | 2022204452 | 7/2022 |
| CA | 2 868 933 | 10/2013 |
| CA | 2 792 070 | 10/2021 |
| CN | 106255985 | 12/2016 |
| CN | 112036952 | 12/2020 |
| EP | 0 419 889 | 4/1991 |
| EP | 0 458 698 | 11/1991 |
| EP | 0 559 358 | 9/1993 |
| EP | 0 977 128 | 2/2000 |
| EP | 0 772 836 B1 | 12/2001 |
| EP | 1 850 278 | 10/2007 |
| EP | 3 201 804 | 4/2020 |
| EP | 3 846 104 | 7/2021 |
| ES | 2 752 058 | 4/2020 |
| GB | 1 322 809 | 7/1973 |
| IN | 349972 | 4/2016 |
| JP | 10-222559 | 8/1998 |
| JP | 10-261009 | 9/1998 |
| JP | 10-293732 | 11/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |
| JP | 2002-163498 | 6/2002 |
| JP | 2002-259753 | 9/2002 |
| JP | 2003-271851 | 9/2003 |
| JP | 2003-316881 | 11/2003 |
| KR | 10-2000-0036594 | 7/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2004-0078798 | 9/2004 |
| RU | 2 181 216 | 4/2002 |
| TW | I256569 | 6/2006 |
| WO | WO 95/034155 | 12/1995 |
| WO | WO 96/000945 | 1/1996 |
| WO | WO 98/041931 | 9/1998 |
| WO | WO 98/041932 | 9/1998 |
| WO | WO 98/041933 | 9/1998 |
| WO | WO 98/049643 | 11/1998 |
| WO | WO 99/017225 | 4/1999 |
| WO | WO 99/017226 | 4/1999 |
| WO | WO 99/038094 | 7/1999 |
| WO | WO 00/004465 | 1/2000 |
| WO | WO 00/028441 | 5/2000 |
| WO | WO 00/055778 | 9/2000 |
| WO | WO 00/065469 | 11/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 2004/031986 | 4/2004 |
| WO | WO 2004/084098 | 9/2004 |
| WO | WO 2004/088464 | 10/2004 |
| WO | WO 2004/114160 | 12/2004 |
| WO | WO 2005/059781 | 6/2005 |
| WO | WO 2006/050278 | 5/2006 |
| WO | WO 2008/022289 | 2/2008 |
| WO | WO 2008/042614 | 4/2008 |
| WO | WO 2008/054403 | 5/2008 |
| WO | WO 2008/127288 | 10/2008 |
| WO | WO 2009/076555 | 6/2009 |
| WO | WO 2009/117518 | 9/2009 |
| WO | WO 2010/132492 | 11/2010 |
| WO | WO 2013/009920 | 1/2013 |
| WO | WO 2014/018900 | 1/2014 |
| WO | WO 2014/066816 | 5/2014 |

(56) References Cited

FOREIGN PATENT DOCUMENTS

| | | |
|---|---|---|
| WO | WO 2015/057538 | 4/2015 |
| WO | WO 2018/144612 | 8/2018 |
| WO | WO 2018/236732 | 12/2018 |
| WO | WO 2019/089439 | 5/2019 |
| WO | WO 2019/136407 | 7/2019 |
| WO | WO 2019/157491 | 8/2019 |
| WO | WO 2019/183483 | 9/2019 |
| WO | WO 2020/198236 | 10/2020 |
| WO | WO 2020/232137 | 11/2020 |
| WO | WO 2021/081516 | 4/2021 |
| WO | WO 2022/109613 | 5/2022 |

OTHER PUBLICATIONS

U.S. Appl. No. 12/705,511, filed Feb. 12, 2010, Bargoli et al.
Actuate, "Delivering Enterprise Information for Corporate Portals", White Paper, 2004, pp. 1-7.
Akl, Selim G., "Digital Signatures: A Tutorial Survey," Computer, Feb. 1983, pp. 15-24.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
Babcock, Gwen, "Aggregation Without Aggravation: Determining Spatial Contiguity and Joining Geographic Areas Using Hashing", SAS Global Forum 2010, Reporting and Information Visualization, Paper 223-2010, pp. 17.
Bitran et al., "Mailing Decisions in Catalog Sales Industry", Management Science (JSTOR), vol. 42, No. 9, pp. 1364-1381, Sep. 1996.
Brick et al. "Unit and Item Response, Weighting, and Imputation Procedures in the 1993 National Household Education Survey (NHES:93)" U.S. Department of Education. National Center for Education Statistics, Working Paper No. 97-05, Washington, D.C., pp. 30, Feb. 1997.
Burr Ph.D., et al., "Utility Payments as Alternative Credit Data: A Reality Check", Asset Builders of America, Inc., Oct. 5, 2006, pp. 1-18, Washington, D.C.
Buxfer, http://www.buxfer.com/ printed Feb. 5, 2014 in 1 page.
Cáceres, et al., "Measurement and Analysis of IP Network Usage and Behavior", IEEE Communications Magazine, pp. 144-151, May 2000.
Census Geography, Excerpted from the Geographic Reference Manual, Nov. 1994, pp. 5.
Check, http://check.me/ printed Feb. 5, 2014 in 3 pages.
Chiba et al., "Mobility Management Schemes for Heterogeneity Support in Next Generation Wireless Networks", 3rd EuroNGI Conference on, 2007, pp. 143-150.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
Corepoint Health, "The Continuity of Care Document—Changing the Landscape of Healthcare Information Exchange," Jan. 2009, pp. 9.
Cohen et al., "Optimizer: IBM's Multi Echelon Inventory System for Managing Service Logistics", Interfaces, vol. 20, No. 1, Jan.-Feb. 1990, pp. 65-82.
"D&B Corporate Family Linkage", D&B Internet Access for U.S. Contract Customers, https://www.dnb.com/ecomp/help/linkage.htm as printed Dec. 17, 2009, pp. 1.
Dankar et al., "Efficient Private Information Retrieval for Geographical Aggregation", Procedia Computer Science, 2014, vol. 37, pp. 497-502.
"Data Loss Prevention (DLP) Software", http://www.symantec.com/data-loss-prevention/ printed Apr. 8, 2013 in 8 pages.

"Data Protection", http://compliantprocessing.com/data-protection/ printed Apr. 8, 2013 in 4 pages.
Davies, Donald W., "Applying the RSA Digital Signature to Electronic Mail," Computer, Feb. 1983, pp. 55-62.
"Debt Settlement: Watch Video on how to Pay Your Debt Faster", http://www.debtconsolidationcare.com/debt-settlement.html printed Jan. 9, 2013 in 6 pages.
Elmasri et al., "Fundamentals of Database Systems, Third Edition (Excerpts)", Jun. 2000, pp. 253, 261, 268-70, 278-80, 585, 595.
Ettorre, "Paul Kahn on Exceptional Marketing," Management Review, vol. 83, No. 11, Nov. 1994, pp. 48-51.
"Experian Helps Verify the Identity of Patients and Provide Secure Enrollment to Healthcare Portals by Integrating with Major Electronic Medical Records Platform," http://press.experian.com/United-States/Press-Release/experian-helps-verify-the-identity-of-patients-and-provide-secure-enrollment-to-healthcare.aspx?&p=1, Dec. 19, 2013, pp. 2.
Experian: Improve Outcomes Through Applied Customer Insight, Brochure, Nov. 2009, pp. 20.
Experian: Mosaic Geodemographic Lifestyle Segmentation on ConsumerView [Data Card], as printed from http://datacards.experian.com/market?page=research/datacard_print&prin, Apr. 6, 2012, pp. 4.
Experian: Mosaic Public Sector 2009 Launch, Jul. 2009, pp. 164.
Experian: Mosaic United Kingdom, Brochure, Jun. 2009, pp. 24.
Experian: Mosaic UK—Optimise the Value of Your Customers and Locations, Now and in the Future, Brochure, Sep. 2010, pp. 24.
Experian: Mosaic UK—Unique Consumer Classification Based on In-Depth Demographic Data, as printed from http://www.experian.co.uk/business-strategies/mosaic-uk.html, Jul. 30, 2012, pp. 2.
Experian: Mosaic USA, Brochure, May 2009, pp. 14.
Experian: Mosaic USA—Consumer Lifestyle Segmentation [Data Card], Dec. 2009, pp. 2.
Experian: Public Sector, as printed form http://publicsector.experian.co.uk/Products/Mosaicpublicsector.aspx, Jul. 2009, pp. 2.
Experian, "Experian Rental Payment Data," http://www.experian.com/rentbureau/rental-data.html printed Nov. 22, 2013 in 2 pages.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Garcia-Molina et al., "Database Systems: The Complete Book", Prentice Hall, Inc., Ch. 15, Oct. 1, 2001, pp. 713-715.
"Geographic Aggregation Tool SAS Beta Version 4.1", Environmental Health Surveillance Section, New York State Dept. in Health, Troy, NY, Mar. 24, 2015, pp. 10.
Gionis et al., "Similarity Search in High Dimensions via Hashing", Sep. 7, 1999, pp. 518-529.
"GLBA Compliance and FFIEC Compliance" http://www.trustwave.com/financial-services.php printed Apr. 8, 2013 in 1 page.
Glenn, Brandon, "Multi-provider patient portals get big boost with ONC ruling", Feb. 25, 2013, http://medicaleconomics.modernmedicine.com/medical-economics/news/user-defined-tags/meaningful-use/multi-provider-patient-portals-get-big-boost in 2 pages.
Haffar, Imad, "'Spam': A Computer Model for Management of Spare-Parts Inventories in Agricultural Machinery Dealerships", Computers and Electronics in Agriculture, vol. 12, Issue 4, Jun. 1995, pp. 323-332.
Hampton et al., "Mapping Health Data: Improved Privacy Protection With Donut Method Geomasking", American Journal of Epidemiology, Sep. 3, 2010, vol. 172, No. 9, pp. 8.
Handfield et al., "Managing Component Life Cycles in Dynamic Technological Environments" International Journal of Purchasing and Materials Management, Tempe, Spring 1994, vol. 30, No. 2, pp. 20-28.

(56) References Cited

OTHER PUBLICATIONS

Healow.com, Various screenshots from page titled "Health and Online Wellness," https://healow.com/apps/jsp/webview/index.jsp printed Aug. 19, 2013 in 4 pages.

Healthspek.com, "How Good Are We?" http://healthspek.com/how-good-are-we/ printed Jan. 21, 2014 in 2 pages.

"Healthspek Users Can Now Import Their Doctors' Records into Their Personal Health Record," PRWeb, Nashville, TN, Jan. 14, 2014, pp. 1 http://www.prweb.com/releases/2014/01/prweb11485346.htm.

Herron, Janna, "Social Media-Based Credit Score?", http://www.bankrate.com/financing/credit-cards/social-media-based-credit-score/ , posted Friday, Jan. 13, 2012, printed Nov. 22, 2013 in 2 pages.

Ideon, Credit-Card Registry that Bellyflopped this Year, Is Drawing some Bottom-Fishers, The Wall Street Journal, Aug. 21, 1995, pp. C2.

Igihealth.com, "Orbit® PHR: Personal Health Record (PHR)," http://www.igihealth.com/consumers/orbit_phr.html, printed Jan. 21, 2014 in 2 pages.

Inderfurth et al., "Decision Support for Spare Parts Acquisition in Post Product Life Cycle", Central European Journal of Operations Research, 2008, vol. 16, pp. 17-42.

InsightsOne.com, "Healthcare," http://insightsone.com/healthcare-predictive-analytics/ printed Mar. 6, 2014 in 5 pages.

"Intelligent Miner Applications Guide", IBM Corp., Apr. 2, 1999, Chapters 4-7, pp. 33-132.

"Japan's JAAI System Appraises Used Cars Over Internet", Asia Pulse, Mar. 3, 2000, p. 1.

Jaro, Matthew A., "Probabilistic Linkage of Large Public Health Data Files", Statistics in Medicine, 1995, vol. 14, pp. 491-498.

KÄki, Anssi, "Forecasting in End-Of-Life Spare Parts Procurement", Master's Thesis, Helsinki University of Technology, System Analysis Laboratory, Jul. 27, 2007, pp. 84.

Khare et al., "Nutch: A Flexible and Scalable Open-Source Web Search Engine", CommerceNet Labs Technical Report 04-04, Nov. 2004, pp. 15.

Kim et al., "Optimal Pricing, EOL (End of Life) Warranty, and Spare Parts Manufacturing Strategy Amid Product Transition", European Journal of Operation Research, 2008, vol. 188, pp. 723-745.

Klein, et al., "A Constant-Utility Index of the Cost of Living", The Review of Economic Studies, Sep. 1, 1947, vol. 15, No. 2, pp. 84-87.

Klein, et al., "An Econometric Model of the United States: 1929-1952", North-Holland Publishing Company, Amsterdam, Jun. 1, 1955, pp. 4-41.

Klein, Lawrence R., "The Keynesian Revolution", New York, The MacMillan Company, Jan. 1, 1947, pp. 56-189.

Krupp, James A.G., "Forecasting for the Automotive Aftermarket", The Journal of Business Forecasting Methods & Systems, Winter 1993-1994, vol. 12, No. 4, ABI/Inform Global, pp. 8-12.

Kwan et al., "Protection of Geoprivacy and Accuracy of Spatial Information: How Effective Are Geographical Masks?" Cartographica, Summer 2004, vol. 39, No. 2, pp. 15-27.

Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.

Lapide, Larry, "New Developments in Business Forecasting", The Journal of Business Forecasting, Spring 2002, pp. 12-14.

LendingTree.com, "Lender Ratings & Reviews," http://web.archive.org/web/20091015043716/http://www.lendingtree.com/lender-reviews/, Oct. 15, 2009, in 21 pages.

Li et al., "Automatic Verbal Information Verification for User Authentication", IEEE Transactions on Speech and Audio Processing, vol. 8, No. 5, Sep. 2000, pp. 585-596.

Lobo, Jude, "MySAP.com Enterprise Portal Cookbook," SAP Technical Delivery, Feb. 2002, vol. 1, pp. 1-13.

Loshin, Intelligent Enterprise: Better Insight for Business Decisions, "Value-Added Data: Merge Ahead", Feb. 9, 2000, vol. 3, No. 3, 5 pages.

Lovelace, Robin, "IPFinR: An Implementation of Spatial Microsimulation in R", RL's Powerstar, Jun. 12, 2013, pp. 9, https://robinlovelace.wordpress.com/2013/06/12/ipfinr-an-implementation-of-spatial-microsimulation-in-r/.

Maciejewski et al., "Understanding Syndromic Hotspots—A Visual Analytics Approach", Conference Paper, IEEE Symposium on Visual Analytics Science and Technology, Oct. 21-23, 2017, pp. 35-42.

Manilla, http://www.manilla.com/how-it-works/ printed Feb. 5, 2014 in 1 page.

McNamara, Paul, "Start-up's pitch: The Envelope, please," Network World, Apr. 28, 1997, vol. 14, No. 17, p. 33.

Medick et al., "German Agency to Mine Facebook to Assess Creditworthiness", Jun. 7, 2012, http://www.spiegel.de/international/germany/german-credit-agency-plans-to-analyze-individual-facebook-pages-a-837539.html printed Nov. 22, 2013 in 2 pages.

MERit Credit Engine™, Diagram, https://web.archive.org/web/20020204202530/http://creditengine.net/diagram.htm, copyright 1997, archived Feb. 4, 2002, pp. 1.

MicroBilt, "PRBC Credit Reporting Agency—Payment Reporting Builds Credit," retrieved from http://www.microbilt.com/nontraditional-credit-report.aspx and corresponding "Sample Report," retrieved from http://www.microbilt.com/pdfs/PRBC%20Sample%20Report%20(complete).pdf printed Nov. 21, 2013 in 8 pages.

Microfinance Africa, "Philippines: Microfinance Players to get Their Own Credit Info Bureau," Apr. 5, 2011, http://microfinanceafrica.net/microfinance-around-the-world/philippines-microfinance-players-to-get-their-own-credit-info-bureau/ printed Nov. 22, 2013 in 2 pages.

Microsoft, "Expand the Reach of Your Business," Microsoft Business Solutions, 2004, in 16 pages.

Miller, Joe, "NADA Used-Car Prices Go Online", Automotive News, Jun. 14, 1999, p. 36.

Mint.com, http://www.mint.com/how-it-works/ printed Feb. 5, 2013 in 2 pages.

Moore, John R., Jr. "Forecasting and Scheduling for Past-Model Replacement Parts", Management Science, Application Series, vol. 18, No. 4, Part 1, Dec. 1971, pp. B-200-B-213.

"Mosaic" (geodemography), available from http://en.wikipedia.org/wiki/Mosaic_(geodemography), as last modified Jul. 13, 2012. pp. 4.

Mvelopes, http://www.mvelopes.com/ printed Feb. 5, 2014 in 2 pages.

MyReceipts, http://www.myreceipts.com/, printed Oct. 16, 2012 in 1 page.

MyReceipts—How it Works, http://www.myreceipts.com/howItWorks.do, printed Oct. 16, 2012 in 1 page.

"Name Availability Records", Westlaw Database Directory, http://directory.westlaw.com/scope/default.asp?db=NA-ALL&RS=W...&VR=2.0 as printed Dec. 17, 2009, pp. 5.

Nelson et al., "Efficient, Automatic Web Resource Harvesting", Conference: Eighth ACM International Workshop on Web Information and Data Management (WIDM 2006), Arlington, Virginia, USA, Nov. 10, 2006, pp. 8.

"New FICO score extends lenders' reach to credit-underserved millions", Viewpoints: News, Ideas and Solutions from Fair Isaac, Sep./Oct. 2004 as downloaded from http://www.fairisaac.com/NR/exeres/F178D009-B47A-444F-BD11-8B4D7D8B3532,frame . . . in 6 pages.

Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.

Packer, A. H., "Simulation and Adaptive Forecasting an Applied to Inventory Control", Operations Research, Jul. 1965, vol. 15, No. 4, pp. 660-679.

"Parse", Definition from PC Magazine Encyclopedia, http://www/pcmag.com/encyclopedia_term_0,2542,t=parse&i=48862,00.asp as downloaded Mar. 5, 2012.

(56) References Cited

OTHER PUBLICATIONS

PersonalCapital.com, http://www.personalcapital.com/how-it-works printed Feb. 5, 2014 in 5 pages.
Peters, Peter-Paul, "A Spare Parts Configurator for the European Service Business" (Graduation Report), Honeywell, Industrial Service Logistic Center, Amsterdam, The Netherlands, Mar. 2000, pp. 80.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Ponniah, Paulraj, "Data Warehousing Fundamentals: A Comprehensive Guide for IT Professionals", Wiley-Interscience Publication, pp. 257-289, 377-397, Aug. 3, 2001.
Porter, G. Zell, "An Economic Method for Evaluating Electronic Component Obsolescence Solutions", www.gidep.org/data/dmsms/library/zell.pdf, May 1998, pp. 1-9.
"PostX to Present at Internet Showcase", PR Newswire, Apr. 28, 1997, pp. 2.
PostX, "PostX® Envelope and ActiveView", http://web.archive.org/web/19970714203719/http://www.postx.com/products_fm.html, Jul. 14, 1997 (retrieved Nov. 7, 2013) in 2 pages.
"PremierGuide Announces Release 3.0 of Local Search Platform", Business Wire, Mar. 4, 2004, Palo Alto, CA, p. 5574.
"Qualifying for Debt Settlement", http://www.certifieddebt.com/debt/settlement-qualifications.shtml printed Jan. 9, 2013 in 2 pages.
Rahm, et al. "Data Cleaning: Problems and Current Approaches", Bulletin of the IEEE Computer Society Technical Committee on Data Engineering, Dec. 2000, vol. 23, No. 4, pp. 11.
Raman, et al., "Potter's Wheel: An Interactive Data Cleaning System", Proceedings of the 27th VLDB Conference, Roma, Italy, 2001, pp. 10.
"Resolve Debt for Less: With Help from Freedom Financial" http://www.debtsettlementusa.com/ printed Jan. 9, 2013 in 6 pages.
Roos, Gina, "Web-Based Service Helps OEMs Cure Parts Obsolescence Blues", Electronic Engineering Times, Oct. 8, 2001, p. 86.
Santarini, Michael, "Forecasts the Probable Obsolescence of Components—Module Predicts Parts Life", Electronic Engineering Times, Jan. 11, 1999, vol. 1, p. 48.
SAS, "SAS® Information Delivery Portal", Fact Sheet, 2008, in 4 pages.
Sawyers, Arlena, "NADA to Offer Residual Guide", Automotive News, May 22, 2000, p. 1.
Sax, Michael M., Data Collection and Privacy Protection: An International Perspective, Presentation: Managing Online Risk and Liability Conference, Aug. 31, 1999, pp. 58.
Schneier, B. "Applied Cryptography", John Wiley & Sons, Second Edition, pp. 435-447, 1996.
"ScoreNet® Network", FairIsaac, web.archive.org/web/20071009014242/http://www.fairisaac.com/NR/rdonlyres/AC4C2F79-4160-4E44-B0CB-5C899004879A/0/ScoreNetnetworkBR.pdf, May 2006, pp. 6.
"Settling Your Debts—Part 1 in Our Debt Settlement Series", http://www.creditinfocenter.com/debt/settle_debts.shtml printed Jan. 9, 2013 in 6 pages.
ShoeBoxed, https://www.shoeboxed.com/sbx-home/ printed Oct. 16, 2012 in 4 pages.
Smith, Richard M., "The Web Bug FAQ", Nov. 11, 1999, Version 1.0, pp. 4.
Smith, Wendell R., "Product Differentiation and Market Segmentation as Alternative Marketing Strategies", The Journal of Marketing, The American Marketing Association, Brattleboro, Vermont, Jul. 1956, vol. XXI, pp. 3-8.
So et al., "Modelling and Model Validation of the Impact of the Economy on the Credit Risk of Credit Card Portfolios", The Journal of Risk Model Validation (93-126), vol. 4, No. 4, Winter (Year: 2010).
"STAGG Variables Sum Up Credit Attributes for Automated Decisions", PRWeb, May 11, 2011, pp. 2. http://www.prweb.com/releases/2011/5/prweb8404324.htm.
Stallings, W. "Cryptography and Network Security Principles and Practice", Prentice Hall, Second Edition, pp. 295, 297, Jul. 15, 1998.
Stone, "Linear Expenditure Systems and Demand Analysis: An Application to the Pattern of British Demand", The Economic Journal: The Journal of the Royal Economic Society, Sep. 1954, pp. 511-527, vol. LXIV, Macmillan & Co., London.
Sullivan, Laurie, "Obsolete-Parts Program Thriving", EBN, Manhasset, NY, Jan. 21, 2002, Issue 1296, p. 26.
Tan et al., "Modeling of Web Robot Navigational Patterns", 2000, Department of Computer Science; University of Minnesota, pp. 7.
Tao, Lixin, "Shifting Paradigms with the Application Service Provider Model"; Concordia University, IEEE, Oct. 2001, Canada.
Tennant, Don, "How a Health Insurance Provider Uses Big Data to Predict Patient Needs," http://www.itbusinessedge.com/blogs/from-under-the-rug/how-a-health-insurance-provider-uses-big-data-to-predict-patient-needs.html, printed Mar. 6, 2014 in 2 pages.
Various Posts from the http://www.2p.wrox.com Forums: http://web.archive.org/web/20050452 21950/http://p2p.wrox.com/topic.asp?TOPIC_ID=6513, dated Nov. 15, 2003-Oct. 7, 2004.
"WashingtonPost.com and Cars.com Launch Comprehensive Automotive Web Site for the Washington Area", PR Newswire, Oct. 22, 1998. pp. 2.
Web Page posted at: http://web.archive.org/web20040805124909/http://www.oracle.com/technology/sample_codete/tech/pl_sql/htdocs/x/Case/start.htm, pp. 1 and 4 of the webpages posted on Jan. 7, 2003.
Web Pages printed Nov. 2, 2004 of Internet Draft entitled "Tunneling SSL Through a WWW Proxy", Luotonen, Ari, Netscape Communications Corporation (Dec. 14, 1995); 4 pages. http://muffin.doit.org/docs/rfc/tunneling.sub.-- ssl.html.
Webpage printed out from http://www.jpmorgan.com/cm/ContentServer?c=TS_Content&pagename=jpmorgan%2Fts%2FTS_Content%2FGeneral&cid=1139403950394 on Mar. 20, 2008, Feb. 13, 2006, New York, NY.
Webster, Lee R., "Failure Rates & Life-Cycle Costs", Consulting-Specifying Engineer, Apr. 1998, vol. 23, No. 4, ABI/INFORM Global, p. 42.
Williams, Mark, "Results of the 1998 NASFAA Salary Survey", News from NASFAA, 1998.
Working, Holbrook, "Statistical Laws of Family Expenditure", Journal of the American Statistical Association, pp. 43-56, vol. 38, American Statistical Association, Washington, D.C., Mar. 1943.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Zandbergen, Paul A., "Ensuring Confidentiality of Geocoded Health Data: Assessing Geographic Masking Strategies for Individual-Level Data", Review Article, Hindawi Publishing Corporation, Advances in Medicine, VI. 2014, pp. 14.
Declaration of Paul Clark, DSc. for Inter Partes Review of U.S. Pat. No. 8,504,628 (Symantec Corporation, Petitioner), dated Jan. 15, 2014 in 76 pages.
Exhibit D to Joint Claim Construction Statement, filed in Epsilon Data Management, LLC, No. 2:12-cv-00511-JRG (E.D. Tex.) (combined for pretrial purposes with *RPost Holdings, Inc., et al.* v. *Experian Marketing Solutions, Inc.*, No. 2:12-cv-00513-JRG (E.D. Tex.)) Filed Jan. 14, 2014 in 9 pages.
First Amended Complaint in Civil Action No. 2:12-cv-511-JRG (*Rpost Holdings, Inc. and Rpost Communications Limited* V. *Constant Contact, Inc.; et al.*) filed Feb. 11, 2013 in 14 pages.
First Amended Complaint in Civil Action No. 2:12-cv-511-JRG (*Rpost Holdings, Inc. and Rpost Communications Limited* V. *Epsilon Data Management, LLC.*) filed Sep. 13, 2013 in 9 pages.
First Amended Complaint in Civil Action No. 2:12-cv-513-JRG (*Rpost Holdings, Inc. and Rpost Communications Limited* V. *Experian Marketing Solutions, Inc.*) filed Aug. 30, 2013 in 9 pages.
Petition for Covered Business Method Patent Review in U.S. Pat. No. 8,161,104 (*Experian Marketing Solutions, Inc., Epsilon Data Management, LLC, and Constant Contact, Inc.*, v. *Rpost Communications Limited*) dated Jan. 29, 2014 in 90 pages.
Source Code Appendix attached to U.S. Appl. No. 08/845,722 by Venkatraman et al., Exhibit A, Part 1 & 2, pp. 32.

(56) References Cited

OTHER PUBLICATIONS

International Search Report and Written Opinion in PCT Application No. PCT/US07/76152, dated Mar. 20, 2009.
Official Communication in Australian Patent Application No. 2012281182, dated Jul. 8, 2014.
Official Communication in Australian Patent Application No. 2012281182, dated May 19, 2015.
Official Communication in Chinese Patent Application No. 201280041782.2, dated Mar. 4, 2016.
Official Communication in European Patent Application No. 12811546.6, dated Nov. 25, 2014.
Official Communication in European Patent Application No. 12811546.6, dated Sep. 18, 2015.
Official Communication in Indian Patent Application No. 490/DELNP/2014, dated Jun. 20, 2019.
Official Communication in Russian Patent Application No. 2014101674/08, dated Dec. 15, 2014.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
International Search Report and Written Opinion for Application No. PCT/US09/60393, dated Dec. 23, 2009.
International Search Report and Written Opinion for Application No. PCT/US09/37565, dated May 12, 2009.
International Search Report and Written Opinion for Application No. PCT/US2010/034434, dated Jun. 23, 2010.
International Preliminary Report on Patentability for Application No. PCT/US2010/034434, dated Feb. 4, 2014.
International Search Report and Written Opinion for Application No. PCT/US2013/052342, dated Nov. 21, 2013.
International Preliminary Report on Patentability for Application No. PCT/US2013/052342, dated Feb. 5, 2015.
Official Communication in Australian Patent Application No. 2018215082, dated Jan. 21, 2022.
Partial Supplementary European Search Report for Application No. EP12747205, dated May 14, 2020.
Extended European Search Report for Application No. EP12747205, dated Aug. 14, 2020.
Extended European Search Report for Application No. EP12747205, dated Feb. 11, 2022.
Official Communication in Indian Patent Application No. 201917029540, dated Jan. 7, 2022.
International Search Report and Written Opinion for Application No. PCT/US2018/016258, dated May 16, 2018.
International Preliminary Report on Patentability in Application No. PCT/US2018/016258, dated Aug. 15, 2019.

* cited by examiner

Methodology
Entity Resolution Flow Chart (Part 2)

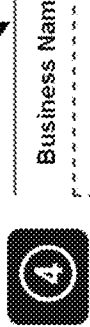

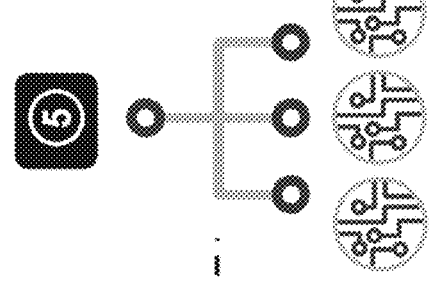

| Business Name | PBIN | Industry | State | Match Score |
|---|---|---|---|---|
| AVVERA TECH LLC | 1234 | Public Utilities | NY | 98.6 |
| AREA TECH LLC | 2222 | Communications | GA | 60.7 |
| AREA TECH LLC | 3333 | Mining | CA | 60.5 |
| AVVERA | 4444 | Other | OK | 59.8 |

- Predictive model that predicts which candidate might be the best match based on the attributes related to that candidate. This may include the industry, credit attributes, firmographic details, name match scores, past queries, and linkage information, etc.
- A purpose of the probability match model is to separate entities that have the same or very similar names. These could be the same business, but for some reason, they are treated as separate entities in the commercial database. This method helps create slight separations in the final Match Score to provide the match that has more data associated with it.
- One embodiment: candidates above 60 Match Score cutoff returned
- Lower match scores may trigger iterative process to request additional information, even non-traditional matching keys since database has a long append of connected information to each candidate.

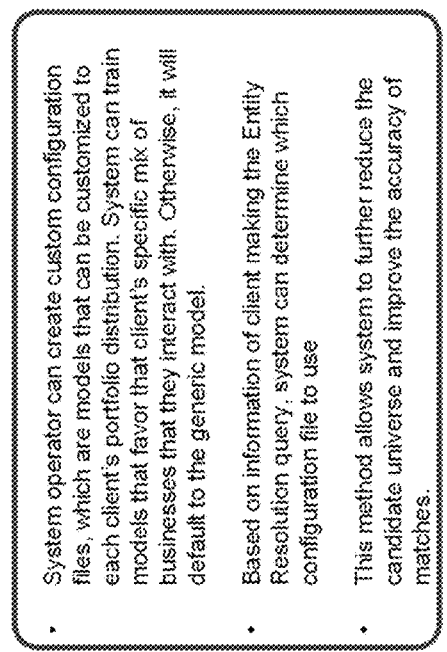

- System operator can create custom configuration files, which are models that can be customized to each client's portfolio distribution. System can train models that favor that client's specific mix of businesses that they interact with. Otherwise, it will default to the generic model.
- Based on information of client making the Entity Resolution query, system can determine which configuration file to use
- This method allows system to further reduce the candidate universe and improve the accuracy of matches.

FIGURE 2B

Business Search

Business Name: Awera Tech LLC ← 902

[Submit]

Matched Businesses

Reduced 148 candidates to 23 above the match cutoff. ← 904

Show [5] entries    Search: [ ]

| Business Name | BIN | City | State | Industry | Match Score |
|---|---|---|---|---|---|
| Awera Tech LLC | 123455821 | New York | NY | Public Utilities | 98.6 |
| Area Tech LLC | 543217315 | Brookhaven | GA | Communications | 60.7 |
| Area Tech LLC | 567853231 | Bakersfield | CA | Mining | 60.5 |
| Awera | 876541224 | Tulsa | OK | Other | 59.8 |
| Awera Tech LLC | 765432108 | Joliet | IL | Communications | 58.5 |

Showing 1 to 5 of 23 entries    Previous [1] 2 3 4 5 Next

Awera Tech LLC
Address: 123 Main St., New York, NY
URL: example.com
Tax ID: 12-3455555

BIN: 123455821

Overview  Details

Industry:
Public Utilities

Primary SIC:
5910

IPV2 Risk Score:
50

Ownership:
Private

Establish Date:
2014-03-26

Active Indicator:
Active

Years on File:
5

Contacts:
Joe Jones, *Officer*

Legal Filings

No bankruptcy, tax liens or judgements found

Legal Balance Amount: $0
Total Legal Filings: 0
UCC's: 40

Credit Status

View graph of Active Trades, Good Trades, and Bad Trades

Recent High Credit: $90,200
Total Combined Balance: $58,900

FIGURE 10

SYSTEMS AND METHODS FOR ENTITY RESOLUTION

PRIORITY AND INCORPORATION BY REFERENCE

This application claims benefit of U.S. Provisional Patent Application No. 63/166,841, entitled "SYSTEMS AND METHODS FOR ENTITY RESOLUTION," filed Mar. 26, 2021, which is hereby incorporated by reference in its entirety.

BACKGROUND

There are a very large number of operating businesses in any given country (many millions in the United States alone). If a party is interested in researching a business, it is often difficult to narrow down results to a specific business entity of interest unless the party has precise identity information regarding the business entity of interest (such as a unique identification number, or a combination of the full legal name of the business entity and its full address). If a given party or user interested in researching or retrieving information regarding a target business entity only enters a partial name of the business entity when searching (such as a shortened version of the official legal name of the entity, as may be used in marketing materials or colloquially in the industry), it would not be uncommon for over one hundred potential entity matches to exist based on the entered name alone.

BRIEF DESCRIPTION OF THE DRAWINGS

Specific embodiments will be described with reference to the following drawings:

FIGS. 2A, 2B and 2C provide an example data flow for entity resolution, according to some embodiments.

FIG. 9 is an illustrative user interface that may be presented to a user who wishes to search for information regarding a business entity by entering only the entity's name (or a portion thereof).

FIG. 10 is an illustrative user interface that presents various business information regarding a user-selected entity.

DETAILED DESCRIPTION

Figure 1A:
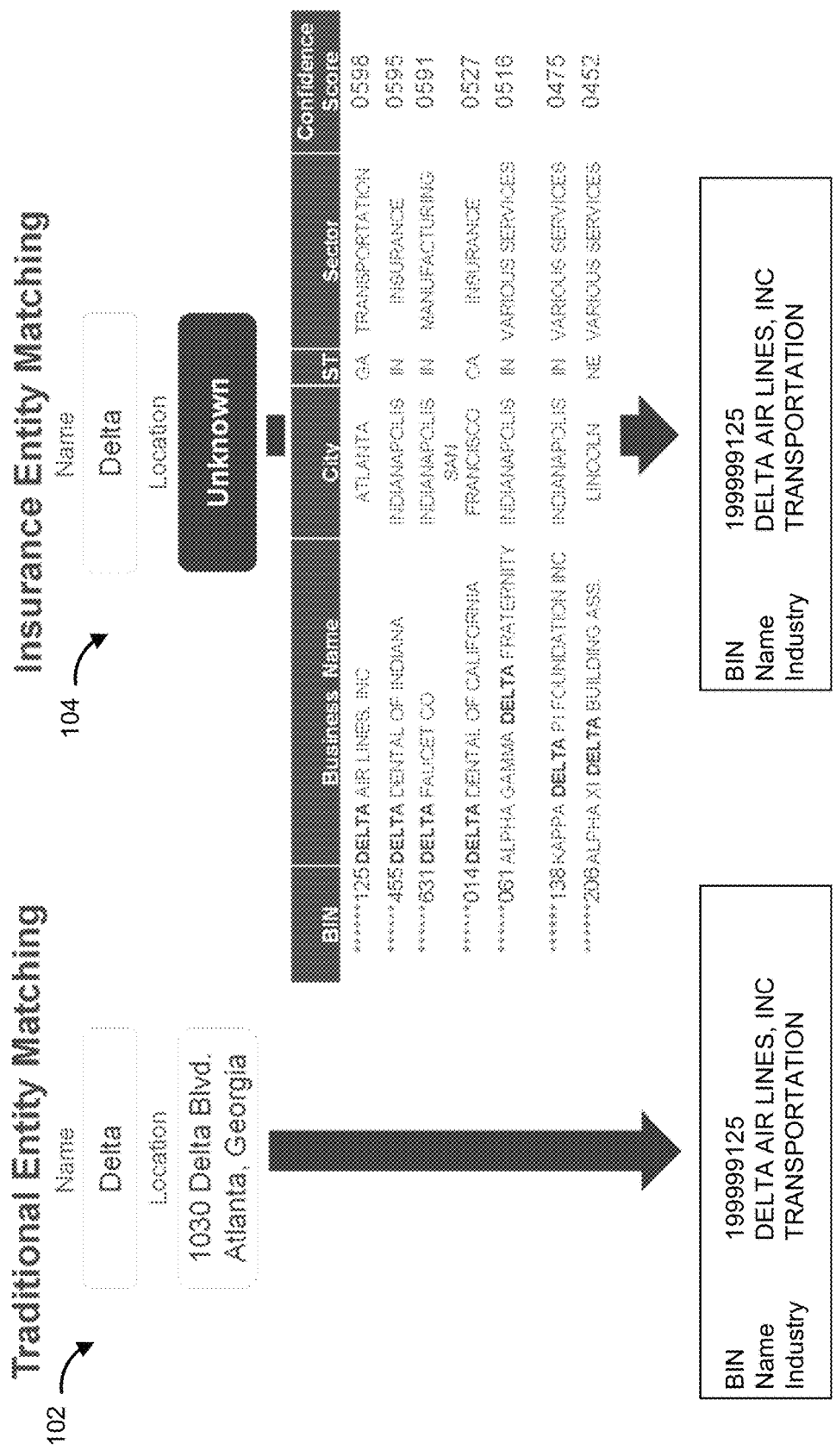
FIGS. 1A and 1B are visual representations contrasting entity matching processes with and without entity location information provided in the search request.

Generally described, aspects of the present disclosure relate to systems and methods for identifying a target business entity that a user intends to refer to based on input that may include as little as only a partial name of the entity. This may be particularly useful, among other uses, in the commercial insurance industry, where underwriters may work with brokers in a manner where the full business entity information for the entity to be insured is not communicated or passed between all of the parties. For example, an insurance application/quote/bind process often begins with submission of just a business name. Business name variations and inaccuracies make it difficult to discern a specific business confidently. Frequently, according to existing systems, insurers (or reinsurers) require human intervention to manually lookup business information, often leading to inaccuracies.

In many instances, for example, a number of underwriters may need to quickly view various information regarding a business (such as business facts information, among other data) to make an underwriting decision. However, these underwriters or other individuals may only have the business's name readily available (e.g., the person may know the company by its common name and be familiar with the company, but not have immediate access to a unique business identification number, an address, or other information that would enable a quick lookup of a more detailed profile of the company, as may be available through public sources, third party sources, and/or an internal database of the underwriter's own systems). Aspects of the present disclosure provide an Entity Resolution (ER) tool designed to accurately identify a business with only a name or partial name provided by a user. The methods disclosed herein enable insurers or other users to confidently standardize and unify business records in their portfolio using ER and resulting Business Identification Number (BIN) information.

The ER tool and system described herein may support insurers and reinsurers, among other use cases. This tool accurately matches a query to a business using only the business name as an input, though additional information may optionally be provided by the user to improve results. Existing business matching tools typically require at least a name and address. Using name only, methods described herein include searching for all candidates in large business databases (which may be reduced and organized at the entity level), algorithmically filtering based on likelihood of individual entities to be insurable or seeking insurance, and resolving the search to the most probable matching entity. These and other methods described herein provide insurers an accurate approach to matching regardless of policy source, resulting in a standardized name and corresponding BIN.

While insurance use cases are often used as an example herein, it will be appreciated that there are many other instances in which the entity matching features described herein may be utilized. As some examples, other uses may include: standardizing self-reported employment data to indicate the correct company where an individual works after the individual provides only an entity name or partial entity name; determining the company subject to a credit card transaction based on the merchant name indicated in credit card transaction data; and standardizing company names on a supplier list, customer list, and/or marketing prospect list.

The volume of businesses and their possible name variations require sophisticated modeling as well as broad and deep data sources to resolve to a business entity. The ER processes described herein may begin by finding all businesses with similar names in a business records database.

The ER system may then examine the underlying characteristics associated with each candidate's BIN to enhance the accuracy and reliability of the name-only matching results. Finally, when used in the insurance context, the ultimate matching business may be identified based upon which of the businesses is most likely to appear in an insurance portfolio (such as based on the specific requesting entity and/or their industry specializations). For example, the system may leverage one or more custom built individual models to assist in this prediction. A custom model may employ a similar approach to an existing (client agnostic) model to look for a best match, but the customized version may be designed and/or trained for each individual insurer's biases (or other client's biases in use cases outside of insurance).

For even greater accuracy in selecting the correct business, the ER system can include additional non-traditional query information or use a higher probabilistic score threshold to increase the accuracy of the match. For example, when the name of a business is accompanied by its industry segment, matching confidence has been seen to increase to 90%, and supplementing both industry and State location increased the match confidence to 95%. Similarly, at elevated score thresholds in the same evaluations, the ER approaches herein demonstrated 93-95% accuracy while maintaining high coverage. The simplicity of using any additional information available may effectively become a filtering step to reduce the candidate list rather than requirement as a search key, according to some embodiments.

The ER approaches herein deliver accurate results to insurers with varying or inconsistent business matching approaches. For insurers or reinsurers with multiple companies, lines, or systems that don't easily communicate, ER can be used to generate a master policy list with the resulting BIN. An immediate impact of knowing the BIN is the ability to then augment the policy that previously only had the business name with additional firmographic information including the address, industry codes such as SIC or NAICS, tax ID, and/or URL. The BIN and additional data can be used to query one or more application programming interfaces (APIs) or to supplement matching methods for data enrichment. Improved matching streamlines submissions processes by eliminating costly errors or manual lookups. It can also expose hidden relationships and unknown parent/child linkages among insured companies. Cross-sell opportunities, redundancies or even potential fraud can be identified if one has multiple policies covering the same entities.

Portfolio management and underwriting require accurate identification of a business entity along with all its associated businesses. Features described herein can accurately achieve this with minimal information. The system allows insurers or reinsurers to standardize and unify internal portfolio data, as well as confidently match new records to quickly create a single customer view with only a business name as a search input, in some embodiments. Once a specific business is identified, the system can return a standardized business name and the corresponding unique BIN, which can then be used to access hundreds of data elements on that business.

The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the systems and methods described herein.

Figure 1B:
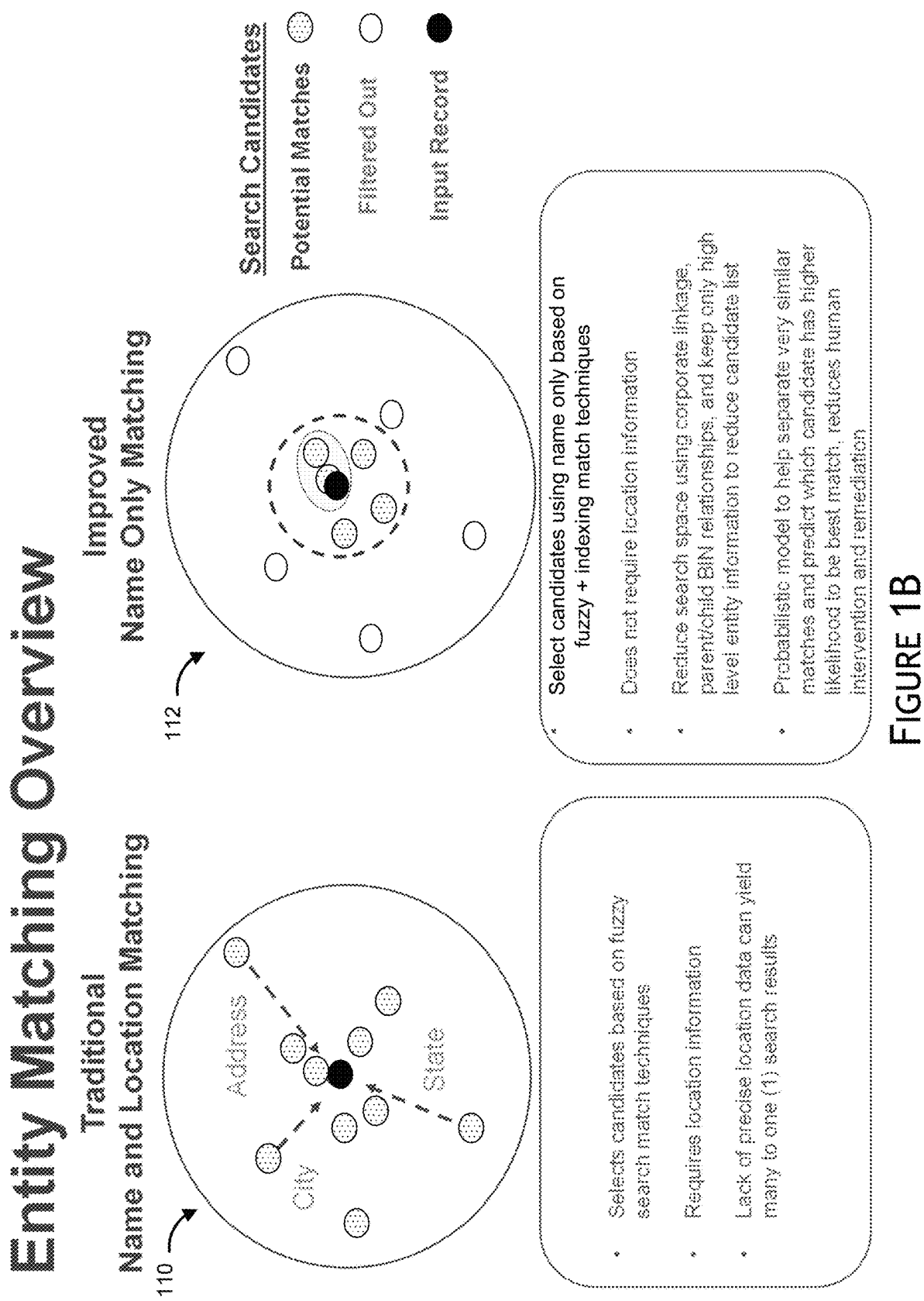

FIGS. 1A and 1B are visual representations contrasting entity matching processes with and without entity location information provided in the search request. As mentioned above, a challenging problem in commercial insurance is to identify an entity with only a business name and without any additional context. In typical matching systems, the inquirer seeking business verification typically provides both name and location for better accuracy. This is illustrated in flow overview 102 of FIG. 1A, in which a user provides both an entity name and full address of the entity in order for a system to resolve the request to a given BIN using relatively simple matching techniques. Alternatively, if the inquirer only provides the business name, as in flow 104 of FIG. 1A, it is possible that they want to broadly identify the corporate entity without precise location resolution. Existing matching systems cannot automatically discover a company and the location correctly without additional context.

However, systems described herein can reduce the search space and simplify the match process in a manner that still results in the correct BIN from among a potentially large set of potential matches (e.g., as shown in the table in FIG. 1A illustrating various BINs having business names that include the searched string). With respect to flow overview 104 in FIG. 1A, there may be over eight hundred candidates generated from the "Delta" query initially. The system may reduce candidates by leveraging unique BINs to dedupe. The system may then generate model attributes from credit attributes and/or firmographics data, as will be described further below. The system's final selection may be based on a combination of scores and optionally input from an underwriter or other user of the system (e.g., an entity or person submitting the query).

Referring to FIG. 1B, overview 110 depicts aspects of a traditional name and location matching process. As illustrated in overview 110, these traditional search techniques of existing systems may require location information for the business being searched, such that the lack of precise location data can yield many-to-one search results that are not desired. In contrast, the name only matching described herein may, as depicted in overview 112, use name only as input without requiring location information. The system may then reduce the search space using corporate linkage and parent/child BIN relationships, and keep only high level entity information to reduce the candidate list, according to some embodiments. A probabilistic model may also be employed to help separate very similar matches and predict which candidate has a higher likelihood to be the best match, which reduces human intervention and remediation.

Figure 1C:
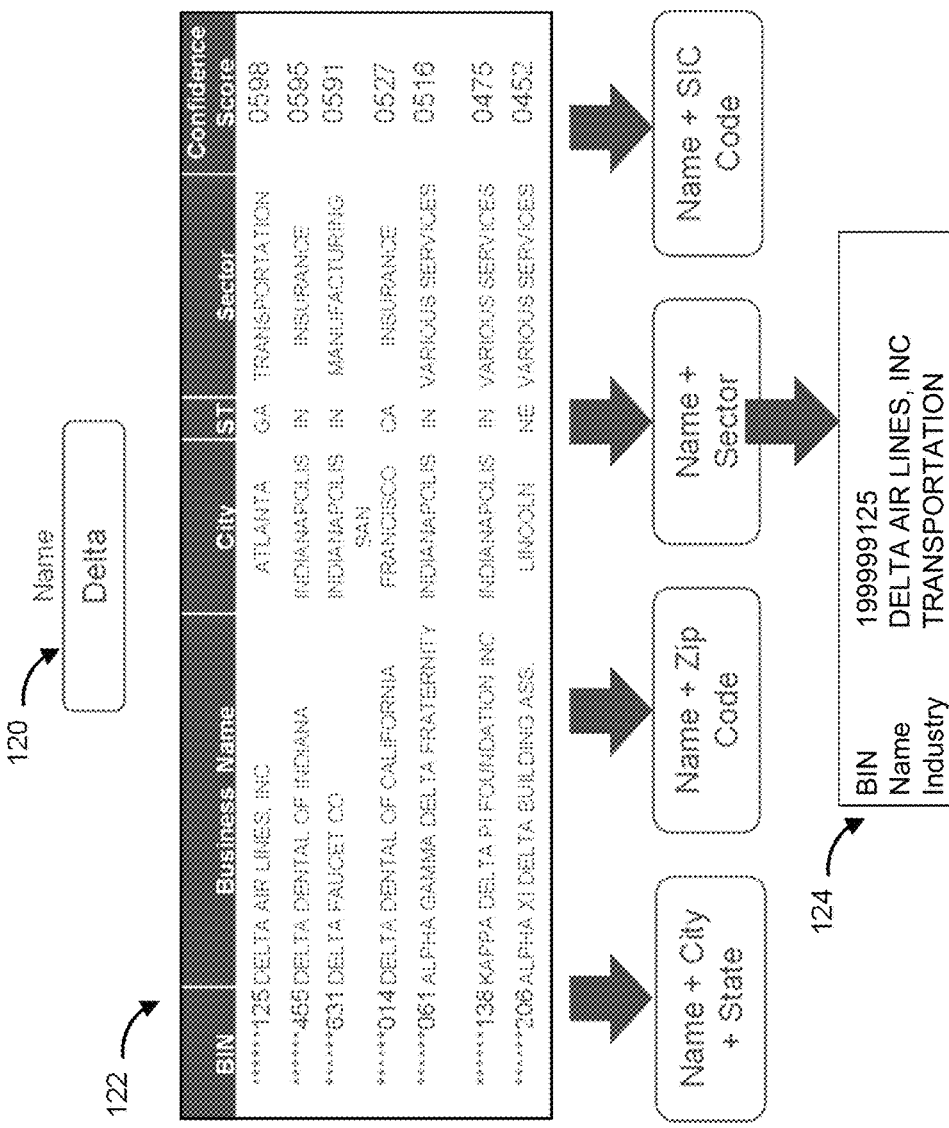
FIG. 1C visually depicts examples of a waterfall approach to entity matching with only a partial entity name provided as search criteria.

FIG. 1C visually depicts examples of a waterfall approach to entity matching with only a partial entity name provided as search criteria. A waterfall approach may be applied by the system to resolve challenging entity name queries and improve match confidence. The system may leverage additional data to help with particularly difficult match cases. As illustrated, the system may leverage additional data fields to help resolve the correct business entity match for the search query 120 ("Delta"). In this embodiment, if the entity's city, state, sector and/or other relevant information is unavailable, the system can provide a list of probabilistic candidates 122. Alternatively or additionally, the system can then take a waterfall approach and apply best matching techniques to whatever fields are available in order to arrive at a best match 124. These and other approaches will be further described below.

Figure 2A:
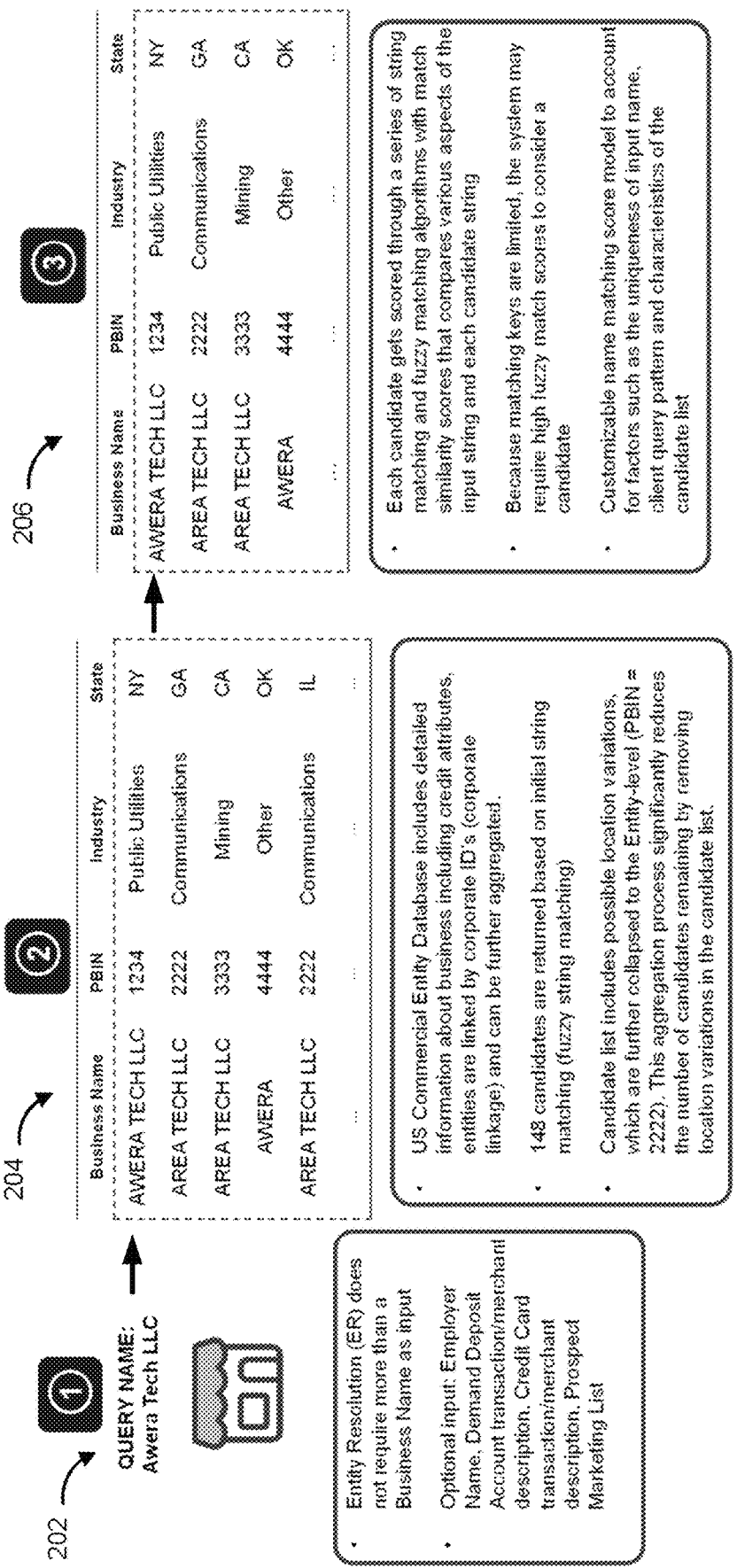
Figure 2C:
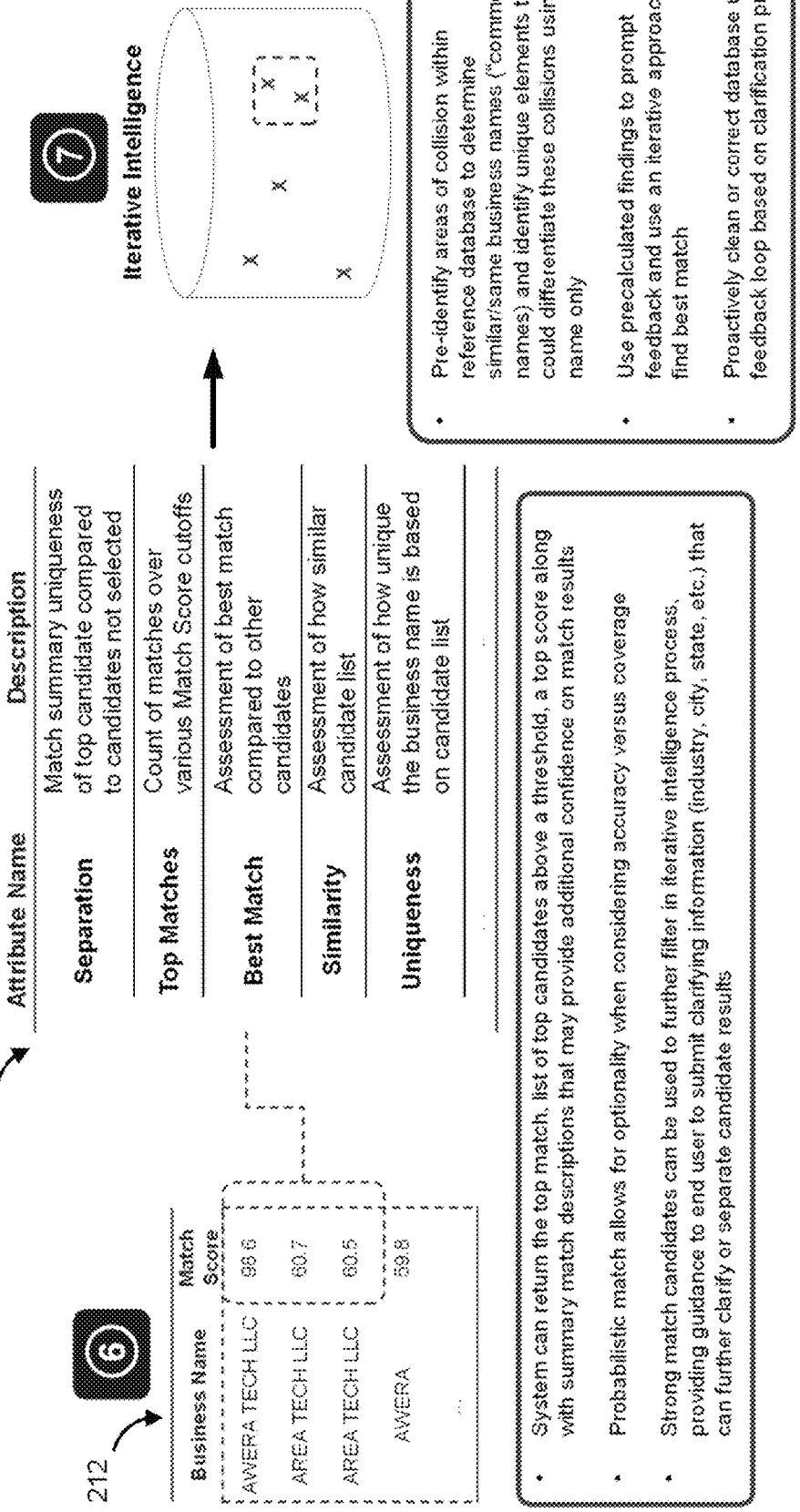

FIGS. 2A, 2B and 2C provide an example data flow for entity resolution, according to some embodiments. As illustrated in step (1) of FIG. 2A, the system may receive a query 202 that includes an entity name of the entity of interest to the user (in this case, "Awera Tech LLC"). As further illustrated, the user may optionally provide additional criteria if desired. At step (2), initial candidate results 204 may be determined by the system. These results may be determined from a database of commercial entity information, which includes detailed information about businesses including credit attributes, where entities may be linked by corporate ID's (corporate linkage) and can be further aggregated. A fuzzy matching algorithm may be employed for determining this candidate list. The candidate list may include possible location variations, which are further collapsed to the entity level (a parent BIN, "PBIN," equal to 2222 in this example). This aggregation process significantly reduces the number of candidates remaining by removing location variations in the candidate list.

Next, at step (3) of FIG. 2A, the system may generate, for each candidate, a match score through a series of two or more string matching and fuzzy matching algorithms. These match similarity scores generated by these algorithms may be based at least in part on comparing various aspects of the input string and each candidate string (business name) in various manners, which may include known string matching techniques. The scoring model may be customizable to account for factors such as the uniqueness of input name, client query patterns, and/or characteristics of the candidate list. As will be appreciated by one of ordinary skill in the art, fuzzy matching algorithms may also be referred to as approximate string matching algorithms, many of which are known and may be used in different embodiments of the present disclosure. For example, fuzzy string matching algorithms may rely on Levenshtein distance or edit distance between strings to determine the extent of similarity.

The method of FIG. 2A continues to step (4) illustrated in FIG. 2B, where the system applies a predictive model to generate match scores for each candidate entity 208. The predictive model may be trained to predict which candidate might be the best match based on the attributes related to that candidate. This may include the industry, credit attributes, firmographic details, name match scores, past queries, and linkage information, among other data. A purpose of the probability match model is to separate entities that have the same or very similar names. These could be the same business, but for some reason, they have been treated as separate entities in the commercial database. This method helps create slight separations in the final match score to provide the match that has more data associated with it. The match score determined at this step (4) may take into account the previous string matching scoring that may have been performed at step (3) above.

Once the match scores are generated, a match score cutoff may be applied to remove low scoring candidate entities. In one embodiment, candidates above a 60 match score are returned (e.g., via an API or displayed in a user interface). If only relatively lower match scores are generated, the system may trigger an iterative process to request additional information from the user, which may include data other than traditional matching keys since the entity database may include a long append of connected information to each candidate.

As mentioned in step (5) of FIG. 2B, a system operator can create custom configuration files, which are models that can be customized to each client's portfolio distribution. The system can train models that favor that client's specific mix of businesses that they interact with (for example, a given insurer may have a certain profile of companies that they typically insure). Otherwise, if no client-specific model has been trained, the system may default to a generic model (which may be specific to at least the industry of the client). This custom modeling allows the system to further reduce the candidate universe and improve the accuracy of matches.

The method of FIGS. 2A and 2B continues to step (6) illustrated in FIG. 2C, where the system may return (from among the entities listed in candidates 212) the top match or a list of top candidates above a threshold. The results may include the top score along with summary match descriptions that may provide additional confidence on match results. As illustrated, the system may consider attributes such as separation, top matches, best match, similarity, and/or uniqueness (as described in table 214). In some embodiments, strong match candidates can be used to further filter candidates in an iterative intelligence process, providing guidance to the user to submit clarifying information (e.g., industry, city, state, etc.) that can further clarify or separate candidate results intelligently and dynamically.

At step (7), the system may optionally apply iterative intelligence processes to further improve the entity resolution results. For example, the system may pre-identify areas of collision within a reference database to determine similar or identical business names ("common" names) and identify unique elements that could differentiate these collisions using name only. As another example, the system may use pre-calculated findings to prompt feedback and use an iterative approach to find the best match, as mentioned above. The system may additionally proactively clean or correct the database entries, such as using a feedback loop based on the clarification process applied.

Pre-identifying areas of collision in a database of company information may include, prior to a particular search being submitted, the system proactively cleaning the database records, removing errors, and/or inspecting the database in a manner that identifies areas of deficiencies or strengths and adds indications of that additional context to the database. Subsequently, for example, a group of candidates in the database (which may logically be considered to be a neighborhood, cluster or other grouping) could be affected by a query, but the system having access to stored data indicating that the neighborhood (or cluster, grouping, etc.) exists and the proximity of those neighbors beforehand may in some instances change how a search, match, and/or data interaction process is considered and resolved.

The iterative intelligence and database enhancements implemented at step (7) may include graph-based record linkage and/or natural language processing, as described further below. With respect to graph-based record linkage, the system may apply efficient graph algorithms to discover connected components (such as entities) of all candidates based on existing corporate linkage data (e.g. as stored in a local or third-party database) and to evaluate intra-similarity within each entity. However existing linkage is not always complete. There are often singular node or smaller connected components representing the same entity of another disconnected entity. Using the similarity score of the entity resolution processes described above, the system may compute the connection strength of each pair inside the candidate list. Merging of the nodes and components may then be proposed if the connection strength is above a certain threshold, where the threshold may also be a learnable parameter from the data. Additional data sources such as business contact and employment information can also be used to propose corporate linkage. In this case, the connection strength can be improved by considering the overlap of owners and employees.

With respect to natural language processing (NLP), NLP may be utilized in connection with business name embedding. The system can apply NLP (such as using Transformer) to create vector representations of input business name strings such that the distance between similar names of the same entity is small. This may involve fine-tuning a pre-trained character level Transformer model (such as CharacterBert) on the system's (or other data source's) commercial database. These vector representations allow further development of models to predict potential conflicts in the database before executing the query and fast retrieval of candidates using approximate nearest neighbor search algorithms to enhance the ER system. In addition, the distance between a pair of embeddings can be directly used as the name matching score and connection length for the graph analysis, in some embodiments.

As additional information regarding steps described above (such as at step 5), according to some embodiments, given the candidates based on similarity alone, the system may apply an additional passive method using commercial credit and firmographics data attached to candidate records to predict the likelihood that a candidate belongs to a given client portfolio or to help the system distinguish similar candidates from each other. The developed model may be considered an Entity Resolve model and/or may be employed within the probability match model, according to some embodiments.

First, at block 302, the system may receive a query that includes at least a partial business name. At block 304, the system may perform initial string matching between the input string and records in a commercial database to determine initial candidate matching entities, as was described previously above. Next, at block 306, the system may generate a name match score for each candidate matching entity relative to the input string, such as by utilizing two or more string matching and/or fuzzy matching algorithms, as described above.

At block 308, the system may apply a probability match model based at least in part on attributes stored in association with the candidate entities (e.g., industry, credit attributes, firmographic details, past queries, and/or linkage information, among others) to generate an overall match score for each candidate entity. This probability match model may also use the name match score determined in the prior block above as input. Though not illustrated in FIG. 3, the system may optionally implement additional features or steps to narrow the candidate list or improve relevance of the results, such as narrowing the search space based on the particular client, industry, or other information.

Lastly, at block 310, the system may output information regarding one or more entity candidates having a highest match score and/or a match score exceeding a threshold, or prompt for more information if the threshold is not met. The

TABLE 1

Entity Resolve model features, according to some embodiments

| Variable (Model Feature) | Description |
| --- | --- |
| Total_Account_Balance | Total dollar balance for all trade lines on business |
| Recent_High_Credit | Highest single line credit |
| Combined_Account_Balance | Total dollar balance for all new and continuously reported trade lines |
| Number_of_Legal_Items | Number of legal items reported. Made up of federal, state and local tax liens, bankruptcies, collections and UCC filings |
| Estimated_Number_of_Employees | Estimated number of employees |
| Sector_woe | Risk variable built from the business sector |
| Estimated_Annual_Sales_Amount | Estimated annual sales amount |
| Combined_DBT | Days-Beyond-Terms score (DBT) for new and continuous trade lines |
| State_woe | Risk variable built from the business location (State) |
| Number_of_Derogatory_Legal_Items | A count of the number of federal, state and local tax liens, Bankruptcies and Judgments on the business |
| Lien_count | Count of original liens placed |
| Collection_count | Count of collection placed |

Table 1 above illustrates sample features for an ER model, in some embodiments. The feature importance or weight assigned to each feature by the model (as may be seen in Shapley values) may favor or relatively highly weight a Sector feature (e.g., the business sector or industry that the entity operates in, as converted into a risk variable) and/or one or more commercial credit attributes for the entity (such as the variables identified above as Number_of_Legal_Items, Recent_High_Credit, Combined_Account_Balance, etc.).

Figure 3:
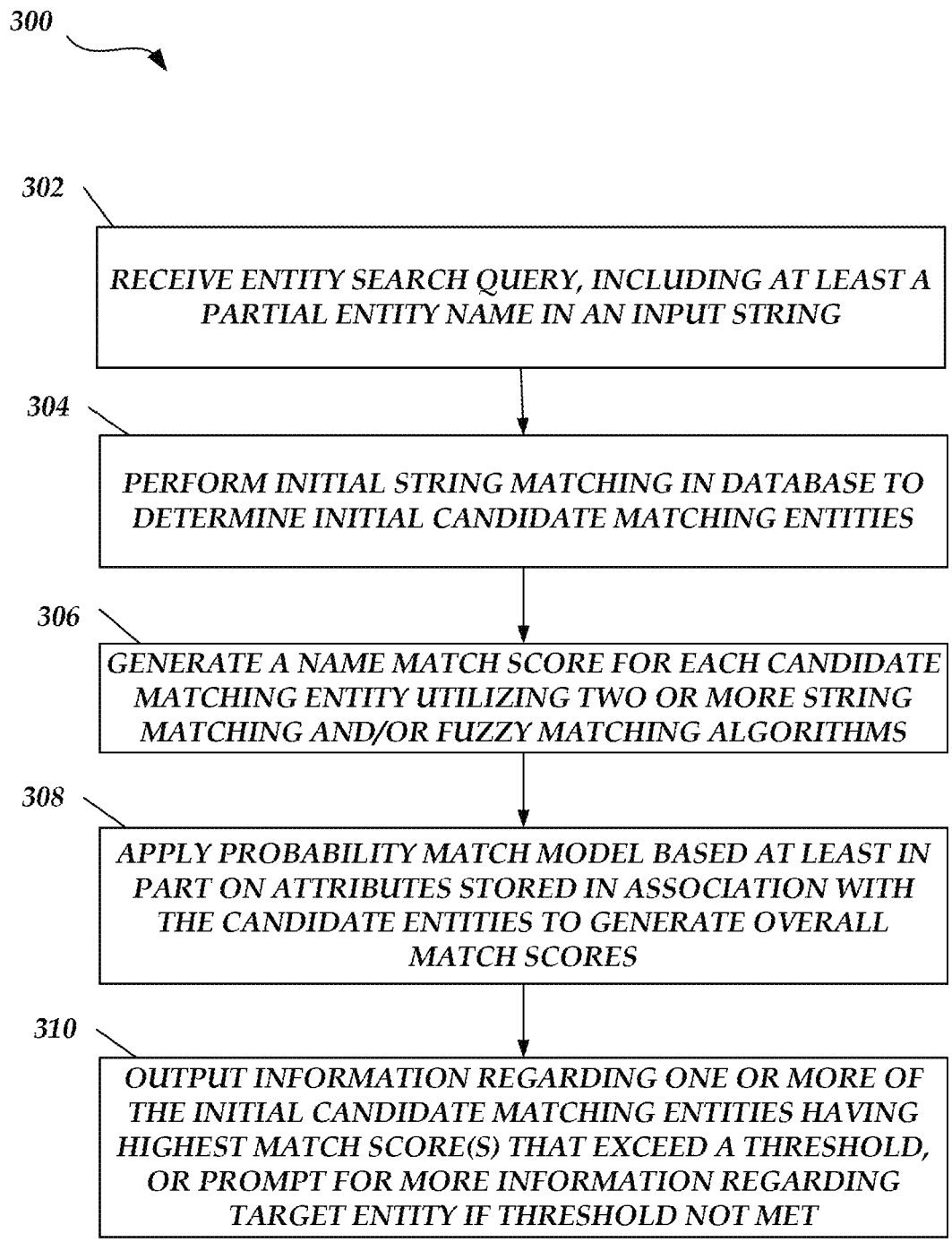
FIG. 3 is a flow chart of an illustrative process for entity resolution in response to a search query, according to some embodiments.

FIG. 3 is a flow chart of an illustrative process 300 for entity resolution in response to a search query, according to some embodiments. Process 300 largely follows the method described above with respect to FIGS. 2A, 2B and 2C, though shown in a different form, so the blocks will not be described in detail below.

output may be in an API response to another system, or may be included as information to be displayed to the requesting user in a user interface.

Figure 4:
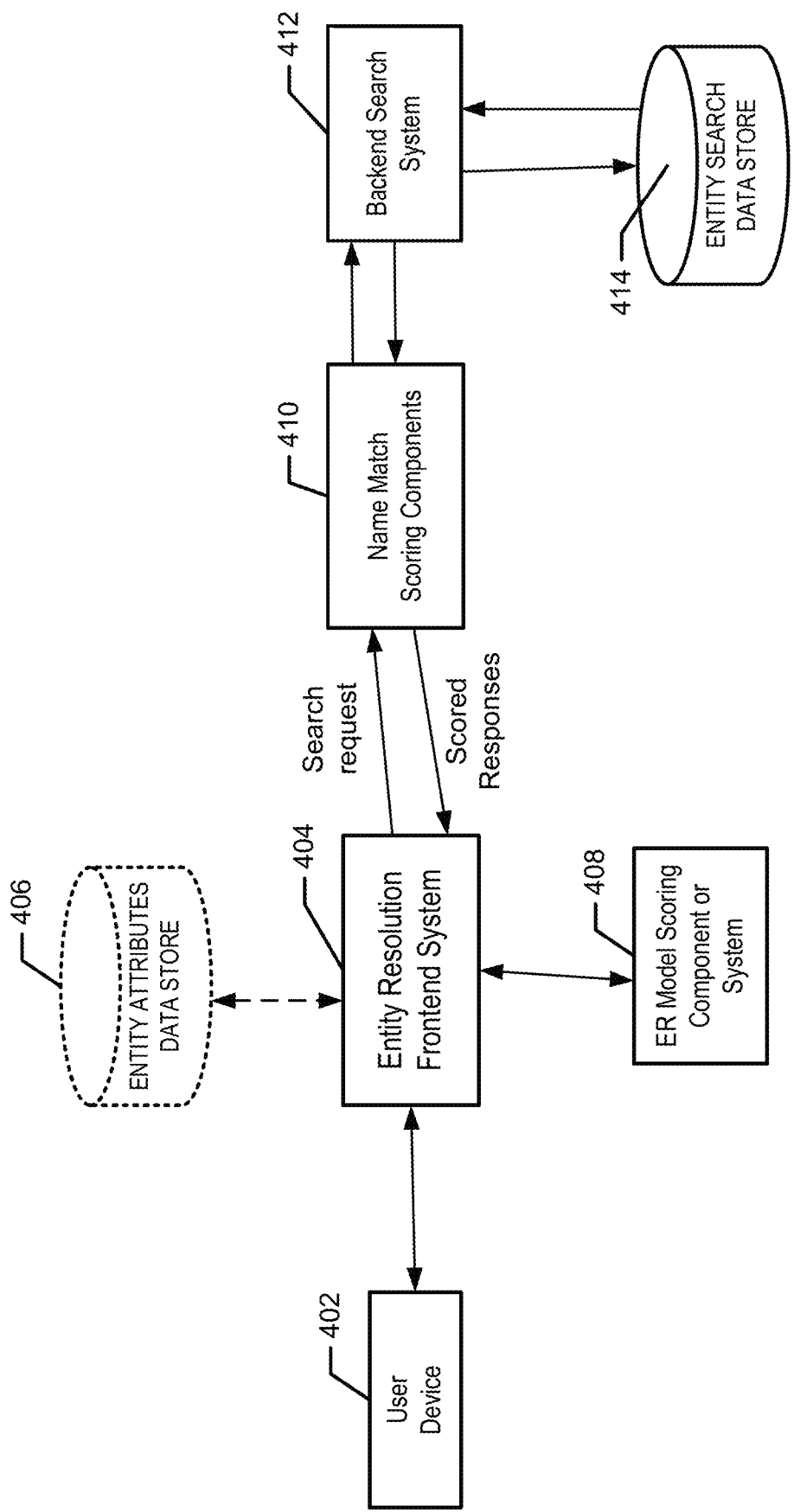
FIG. 4 depicts an illustrative operating environment for entity resolution, according to some embodiments.

FIG. 4 depicts an illustrative operating environment for entity resolution, according to some embodiments. The various devices, components and systems may be in local communication with one another, or may communicate over a network, such as the Internet. The user device 402, such as a computer, mobile phone, tablet device, or other computing device, may be utilized by a user who submits an entity search request to the entity resolution frontend system 404. The entity resolution frontend system 404 may be in communication with an entity attributes data store 406 that stores various detailed information regarding businesses (such as all or substantially all businesses operating in a given jurisdiction that meet certain size criteria or other criteria). In other embodiments, such business attributes data may be appended to entity search data store 414 in order to retrieve the attributes along with the query response from the backend search system 412. This alternative arrangement may eliminate any need for the system 404 to look up attributes separately (such as from the illustrated separate attributes data store 406) when scoring candidates through the ER model scoring component(s) 408.

Upon receiving a query from the user device, the ER frontend system 404 may send a corresponding search request to the name match scoring components (such as via an API call), which may in turn access a backend search system 412 configured to search the entity search data store 414 for the given entity name. In some embodiments, the backend search system 412 may be an existing system configured to typically respond to entity searches that include location criteria for the entity (whereas the search provided by the user to the ER frontend system 404 may not include such location information). The name match scoring components 410 may receive results from the backend search system 412 and apply name matching scoring models discussed above. The scored responses may be returned to the ER frontend system 404, which may then request additional scoring (such as using a probability model) from the ER model scoring component or system 408, such as using techniques described above with respect to steps 4-7 of FIGS. 2B and 2C. Final results for the query may be determined or gathered by the ER frontend system 404 and returned to the user device 402.

Figure 5:
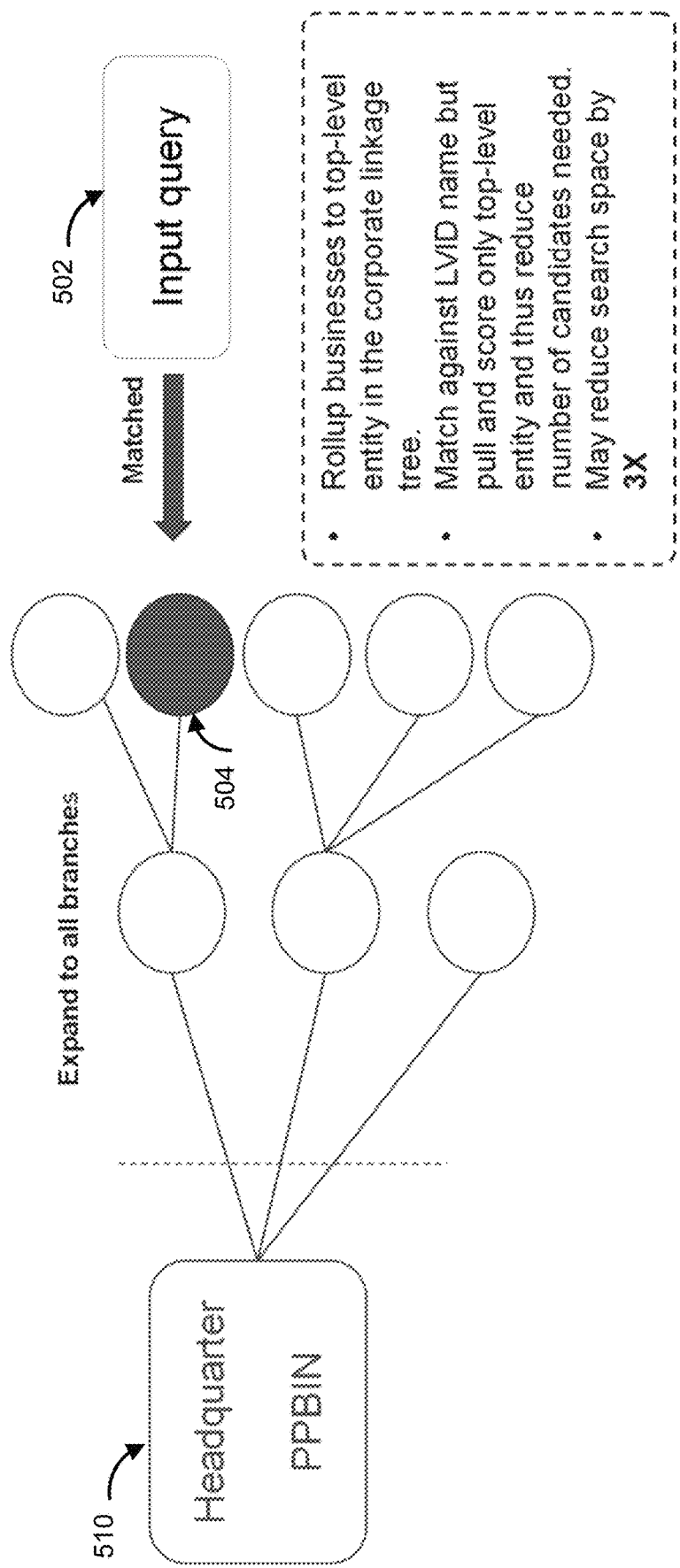
FIG. 5 graphically depicts a manner of performance optimization for entity resolution by leveraging corporate linkage.

FIG. 5 graphically depicts a manner of performance optimization for entity resolution by leveraging corporate linkage. As illustrated, an input query 502 may be matched by the system to a particular entity (such as a BIN) represented by node 504. The system may then rely on a corporate linkage tree to apply a rollup to a top-level business entity 510 in the tree or graph structure. This technique may reduce search space substantially.

Figure 6:
FIG. 6 depicts example corporate information and a corresponding corporate linkage graph structure.

FIG. 6 depicts example corporate information 602 and a corresponding corporate linkage graph structure 604. As illustrated, the graph structure 604 has been generated by the system using three levels of BINs (designated as "ultimate BIN," "parent BIN," and "child BIN"), which may be visualized in a tree structure such as that shown in FIG. 5 described above. As shown in table 602, the various subsidiary entities all share a common word in their names ("Experian"), and may have been connected to one another based on attributes such as name, address, sector, and/or others having commonalities with one another.

Figure 7:
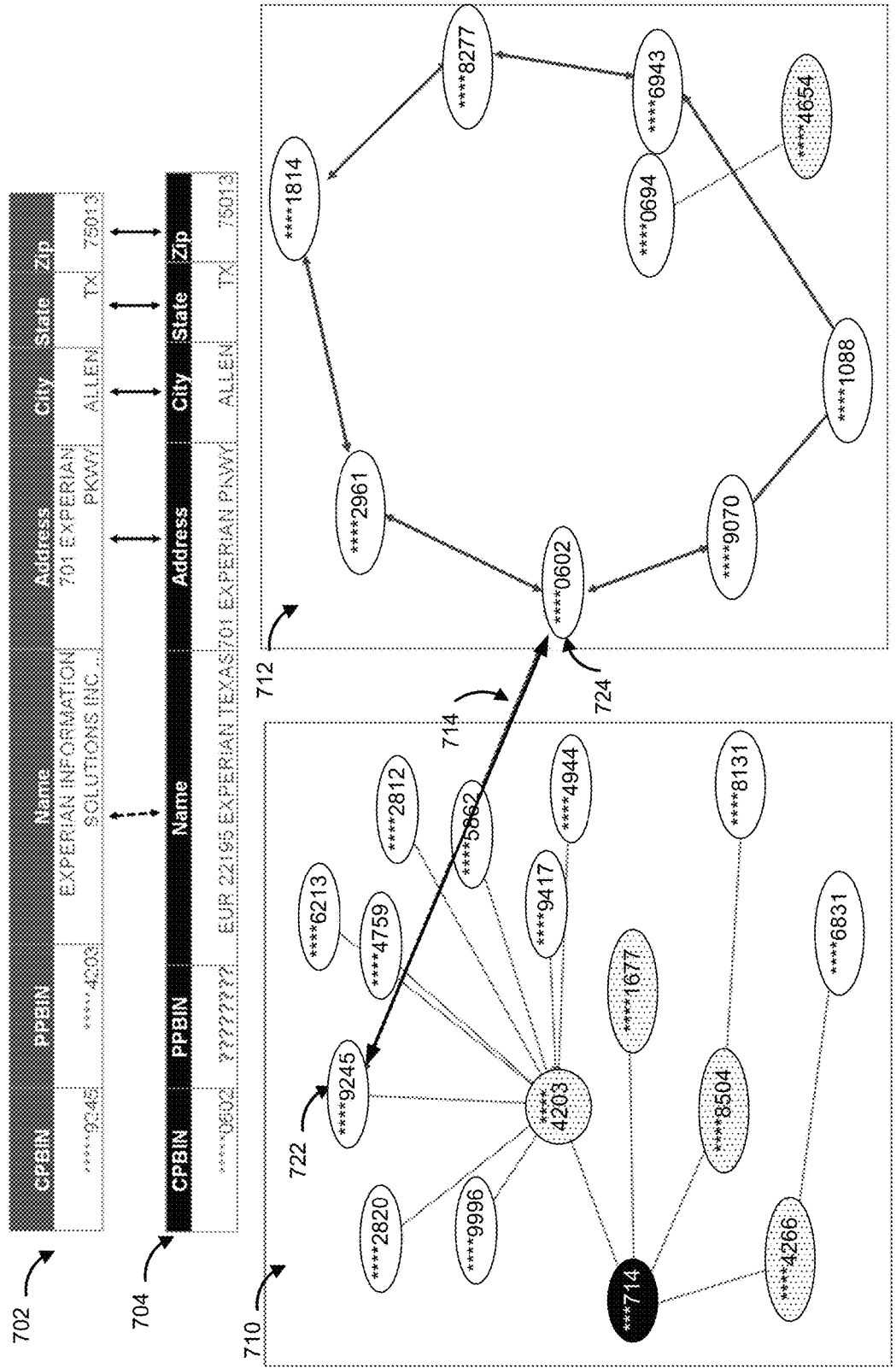
FIG. 7 graphically represents assigning new linkage between nodes in a corporate linkage graph structure.

FIG. 7 graphically represents assigning new linkage between nodes in a corporate linkage graph structure. As shown in tables 702 and 704, the two entities listed have many commonalities or linking keys (such as a partial matching name, and a matching address, city, state and zip code). In other embodiments, less closely matched entities may nonetheless be identified from their corporate attribute information. Based on the matching in tables 702 and 704, the system has stored a new link, edge or association 714 between node 722 (of subgraph 710) and node 724 (of subgraph 712), which represent the BINs of entity 702 and 704, respectively.

Figure 8:
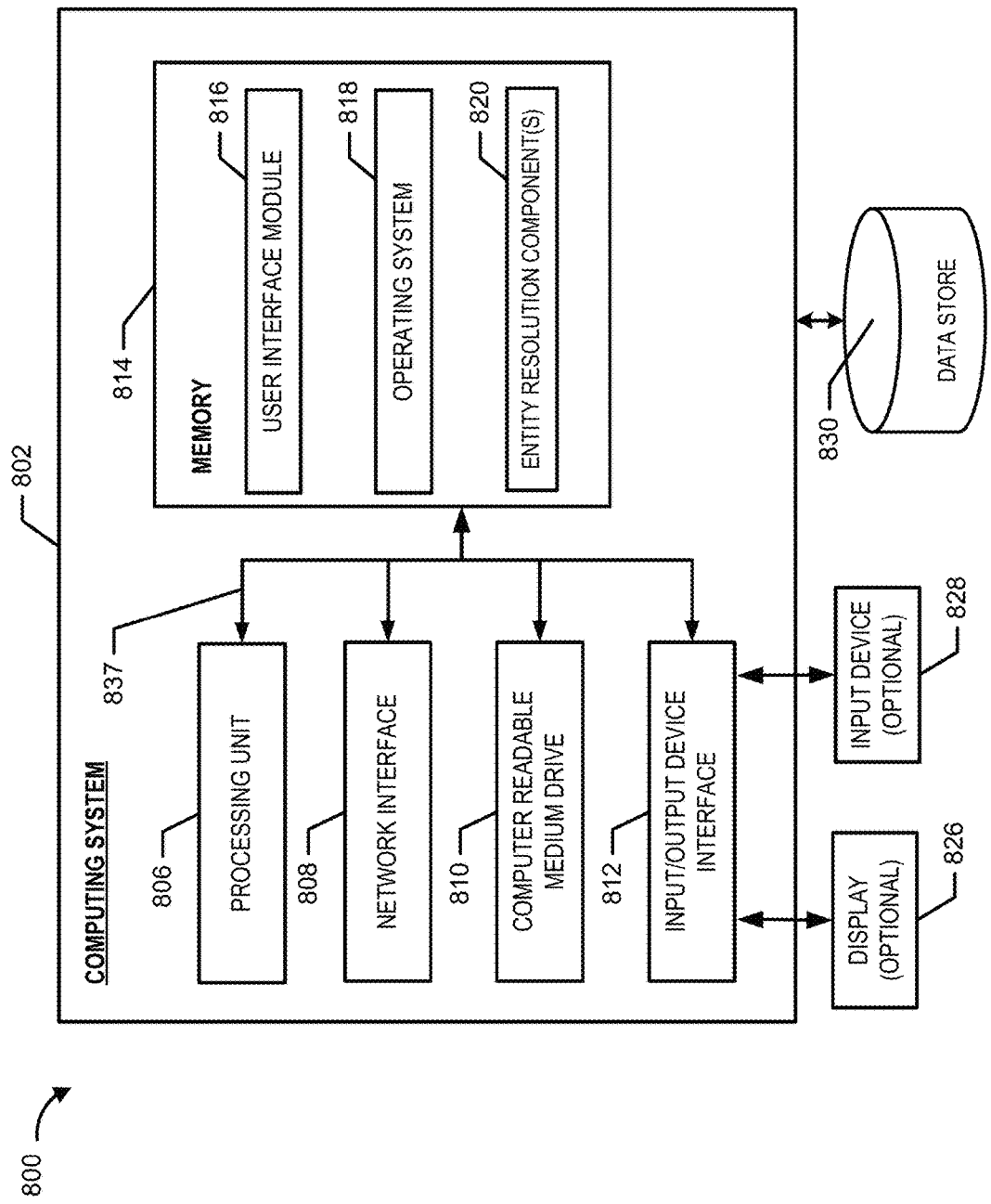
FIG. 8 illustrates a general architecture of a computing environment, according to some embodiments.

In some embodiments, the systems, computer clients and/or servers described herein take the form of a computing system as shown in FIG. 8. FIG. 8 illustrates a general architecture of a computing environment 800, according to some embodiments. As depicted in FIG. 8, the computing environment 800 may include a computing system 802. The general architecture of the computing system 802 may include an arrangement of computer hardware and software components used to implement aspects of the present disclosure. The computing system 802 may include many more (or fewer) elements than those shown in FIG. 8.

As illustrated, the computing system 802 includes a processing unit 806, a network interface 808, a computer readable medium drive 810, an input/output device interface 812, an optional display 826, and an optional input device 828, all of which may communicate with one another by way of a communication bus 837. The processing unit 806 may communicate to and from memory 814 and may provide output information for the optional display 826 via the input/output device interface 812. The input/output device interface 812 may also accept input from the optional input device 828, such as a keyboard, mouse, digital pen, microphone, touch screen, gesture recognition system, voice recognition system, or other input device known in the art.

The memory 814 may contain computer program instructions (grouped as modules or components in some embodiments) that the processing unit 806 may execute in order to implement one or more embodiments described herein. The memory 814 may generally include RAM, ROM and/or other persistent, auxiliary or non-transitory computer-readable media. The memory 814 may store an operating system 818 that provides computer program instructions for use by the processing unit 806 in the general administration and operation of the computing system 802. The memory 814 may further include computer program instructions and other information for implementing aspects of the present disclosure. For example, in one embodiment, the memory 814 may include a user interface module 816 that generates user interfaces (and/or instructions therefor) for display upon a computing system, e.g., via a navigation interface such as a browser or application installed on the computing system 802 or the client computing system 803.

In some embodiments, the memory 814 may include one or more entity resolution components 820, which may be executed by the processing unit 806 to perform operations according to various embodiments described herein. The components or modules 820 may access one or more data store 830 to store and/or retrieve data as described herein. The data store(s) may be part of the computing system 802, remote from the computing system 802, and/or may be a network-based service.

In some embodiments, the network interface 808 may provide connectivity to one or more networks or computing systems, and the processing unit 806 may receive information and instructions from other computing systems or services via one or more networks, such as the Internet. In particular, the computing system 802 may establish a communication link with a network (e.g., using known protocols) in order to send communications to another computing system over the network.

Those skilled in the art will recognize that the computing system 802 may be any of a number of computing systems including, but not limited to, a laptop, a personal computer, a mobile phone, a smartphone, a tablet computer, another wireless device, one or more servers, and the like.

FIG. 9 is an illustrative user interface 900 that may be presented to a user who wishes to search for information regarding a business entity by entering only the entity's name (or a portion thereof). The user interface 900 may be presented, for example, by user device 402 based on user interface data (or API data responses) delivered over a network from entity resolution system 404. As illustrated, the user has entered an input string as the sole query information in field 902. The entity resolution system 404 has generated search results 904 that include 23 potential matches (reduced from 148 matches prior to applying candidate reduction improvements described above), of which the top four results are shown, along with their respective match scores, in descending match score order. While multiple matched entities are shown in sorted order (sorted by descending match score) in user interface 900, in other embodiments, the system may present a single best matching entity automatically in response to the user's submission of only a partial business name, such as in response to the system identifying a match with a sufficiently high match score (such as over a threshold of 98 out of a maximum 100, in one embodiment).

The user may select any of the entity matches displayed in the user interface 900 in order to be presented with various detailed information regarding the entity, such as that shown in user interface 1000 of FIG. 10. FIG. 10 is an illustrative user interface 1000 that presents various business information regarding a user-selected entity. In the illustrated example, the user is shown information such as the entity's industry, ownership information, risk information, contacts, legal filing information, credit status information, etc. It will be appreciated that a variety of other information may be presented once the methods described herein (in combination with any user input) have narrowed the entity search request to a specific, singular entity.

In some embodiments, the entity resolution system may rely on a number of APIs and/or data sources to append or enrich data provided in association with entity queries as described herein. In various embodiments, the APIs or other data sources accessed (and/or the data or information ultimately provided to a searching user) for a given entity may include one or more of the following, which be either internal or external to the system (and may be provided by the same operator as the entity resolution system, or by a third party): credit headers or other headers (such as business identity information); profiles from a commercial credit report database; business aggregates data (e.g., may represent over 400 unique data attributes that represent the building blocks of commercial credit); segment information, such as from one or more businesses API endpoints; risk dashboards (e.g., commercial and/or FSR scores, credit limit amount, current DBT, etc.); business facts (such as key operational facts including SIC, NAICS, public status, sales, employees, etc.); fraud shields (e.g., screens for potential indicators of fraud, including possible OFAC match); scores, such as commercial and/or and financial stability risk scores (which each may include a score, score factors, and/or monthly/quarterly trends); credit status (such as key credit facts about the business, including tradeline count, balance, DBT, etc.); legal filings and collections summaries; trade data (e.g., trade summary, payment experiences, payment totals, trade payment trends, etc.); bankruptcies, liens, and/or court judgments; UCC filings, such as via a summary and/or trends; corporate registrations (e.g., corporate registration information for the business, including filing status); and/or corporate linkage, which may include a partial or full family tree of related entities. Further APIs or other data sources accessed or data provided may include additional business contacts, such as individual owners, company owners, contacts and titles, contacts' business affiliations, etc.; reverse addresses, such as an API that allows input of an address to return businesses affiliated with that address; reverse phone number, such as an API that allows input of a phone number to return businesses affiliated with that phone number; reverse tax IDs, such as an API that allows input of a Tax ID (e.g., an EIN) to return businesses affiliated with that Tax ID; and/or government details, such as economic diversity status, CAGE code, debarred status, government contracts, and/or others.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
receiving, by a computing system, an entity search query via user interaction with a user interface, the entity search query including an input string that includes a partial business name of an entity for which a user would like to retrieve information, wherein the partial business name does not uniquely identify the entity;
determining, by the computing system, initial candidate matching entities by at least performing initial string matching relative to a plurality of stored business records for a plurality of entities;
generating, by the computing system, a name match score for each of the initial candidate matching entities relative to the input string, wherein generating the name match score for each of the initial candidate matching entities utilizes at least two matching approaches, the at least two matching approaches comprising a string matching approach and a fuzzy matching approach;
applying, by the computing system, a probability match model based at least in part on attributes stored in association with each of the initial candidate matching entities to generate an overall match score for each of at least a subset of the initial candidate matching entities; and
generating, by the computing system, a response to the entity search query, the response including information, for display in the user interface, regarding one or more of the initial candidate matching entities having an overall match score exceeding a threshold.

2. The computer-implemented method of claim 1 further comprising causing display, in the user interface in response to the entity search query, of an initial candidate matching entity having a highest overall match score, wherein the initial candidate matching entity having the highest overall match score is determined by the computing system without receiving any information from the user regarding the initial candidate matching entity other than the partial business name.

3. The computer-implemented method of claim 1, wherein the attributes comprise one or more of: an industry, credit attributes, firmographic details, past search queries, or entity linkage information.

4. The computer-implemented method of claim 1, wherein the at least two matching approaches comprise a fuzzy matching approach that calculates an edit distance between an individual initial candidate matching entity and the input string.

5. The computer-implemented method of claim 1, wherein the user represents an insurer that is considering insuring the entity for which the user would like to retrieve information, the computer-implemented method further comprising applying a filter to the initial candidate matching entities based on a likelihood of each of the initial candidate matching entities to be seeking insurance.

6. The computer-implemented method of claim 1, wherein the response includes, for display in the user interface, a Business Identification Number (BIN) for at least one of the initial candidate matching entities having an overall match score exceeding the threshold.

7. The computer-implemented method of claim 1 further comprising, prior to generating the response, reducing an entity search space for the entity search query based on corporate linkage information that associates entities having a parent and child relationship.

8. A computing system comprising:
a non-transitory data store configured to store executable instructions; and
one or more computer processors configured to execute the executable instructions, wherein execution of the executable instructions causes the one or more computer processors to:
receive an entity search query via user interaction with a user interface, the entity search query including an input string that includes a partial business name of an entity for which a user would like to retrieve information, wherein the partial business name does not uniquely identify the entity;
determine initial candidate matching entities by at least performing initial string matching relative to a plurality of stored business records for a plurality of entities;
generate a name match score for each of the initial candidate matching entities relative to the input string, wherein generating the name match score for each of the initial candidate matching entities utilizes at least two matching approaches, the at least two matching approaches comprising at least one string matching approach or fuzzy matching approach;
generate an overall match score for each of at least a subset of the initial candidate matching entities, wherein the overall match score for each individual candidate matching entity of the subset of the initial candidate matching entities is generated based at least in part on (a) the name match score for the individual candidate matching entity and (b) attributes previously stored in association with the individual candidate matching entity; and
generate a response to the entity search query, the response including information, for display in the user interface, regarding one or more of the initial candidate matching entities having an overall match score exceeding a threshold.

9. The computing system of claim 8, wherein execution of the executable instructions further causes the one or more computer processors to cause display, in the user interface in response to the entity search query, of an initial candidate matching entity having a highest overall match score, wherein the initial candidate matching entity having the highest overall match score is determined by the computing system without receiving any information from the user regarding the initial candidate matching entity other than the partial business name.

10. The computing system of claim 8, wherein the entity search query does not include any geographical location information associated with the entity for which the user would like to retrieve information.

11. The computing system of claim 8, wherein execution of the executable instructions further causes the one or more computer processors to apply a client-specific model that scores the initial candidate matching entities based at least in part on attributes of businesses that a client associated with the user has interacted with previously.

12. The computing system of claim 8, wherein execution of the executable instructions further causes the one or more computer processors to apply natural language processing (NLP) to create vector representations of a plurality of business entity names such that a distance between two vector representations corresponds to an extent of similarity between respective business entity names represented by the two vector representations.

13. The computing system of claim 8, wherein the overall match score is based at least in part on graph-based record linkage data whereby nodes representing entities having a corporate relationship are connected in a graph structure.

14. The computing system of claim 13, wherein execution of the executable instructions further causes the one or more computer processors to apply a rollup operation to a top-level business entity node in the graph structure with respect to a connected node.

15. The computing system of claim 8, wherein the overall match score for an individual candidate matching entity is based at least in part on one or more query patterns associated with search queries previously submitted by the user.

16. The computing system of claim 8, wherein the overall match score for an individual candidate matching entity is based at least in part on how unique an individual entity name is relative to entity names of the initial candidate matching entities.

17. The computing system of claim 8, wherein the response includes, for display in the user interface, a Business Identification Number (BIN) for at least one of the initial candidate matching entities having an overall match score exceeding the threshold.

18. The computing system of claim 8, wherein the at least two matching approaches comprise a fuzzy matching approach that calculates an edit distance between an individual initial candidate matching entity and the input string.

19. The computing system of claim 8, wherein the user represents an insurer that is considering insuring the entity for which the user would like to retrieve information, wherein execution of the executable instructions further causes the one or more computer processors to apply a filter to the initial candidate matching entities based on a likelihood of each of the initial candidate matching entities to be seeking insurance.

* * * * *